United States Patent
Nakakubo et al.

(10) Patent No.: US 12,487,217 B2
(45) Date of Patent: Dec. 2, 2025

(54) EVALUATION METHOD AND EVALUATION DEVICE FOR SILAGE FERMENTATION QUALITY

(71) Applicant: NATIONAL INSTITUTE FOR MATERIALS SCIENCE, Ibaraki (JP)

(72) Inventors: Ryo Nakakubo, Ibaraki (JP); Mitsuyoshi Ishida, Ibaraki (JP); Masanori Tohno, Tochigi (JP); Hisami Kobayashi, Tochigi (JP); Genki Yoshikawa, Ibaraki (JP); Kosuke Minami, Ibaraki (JP); Gaku Imamura, Ibaraki (JP); Hideki Matsuzaka, Ibaraki (JP); Takahiro Nemoto, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 622 days.

(21) Appl. No.: 17/914,956

(22) PCT Filed: Mar. 19, 2021

(86) PCT No.: PCT/JP2021/011325
§ 371 (c)(1),
(2) Date: Sep. 27, 2022

(87) PCT Pub. No.: WO2021/200262
PCT Pub. Date: Oct. 7, 2021

(65) Prior Publication Data
US 2023/0147626 A1    May 11, 2023

(30) Foreign Application Priority Data
Mar. 30, 2020  (JP) ................ 2020-059344

(51) Int. Cl.
*G01N 33/00* (2006.01)
*A23K 30/15* (2016.01)
*A23K 50/10* (2016.01)

(52) U.S. Cl.
CPC ........ *G01N 33/0047* (2013.01); *A23K 30/15* (2016.05); *A23K 50/10* (2016.05); *G01N 33/0037* (2013.01); *Y02P 60/87* (2015.11)

(58) Field of Classification Search
CPC ........... G01N 33/0047; G01N 33/0037; A23K 30/15; A23K 50/10; Y02P 60/87
See application file for complete search history.

(56) References Cited

U.S. PATENT DOCUMENTS 11,391,687 B2 *  7/2022  Yoshikawa ........ G01N 33/0031
2013/0133433 A1   5/2013  Yoshikawa et al.
(Continued)

FOREIGN PATENT DOCUMENTS

CN        106211950 A  * 12/2016  ............. A01F 25/16
JP        2018-132325     8/2018
(Continued)

OTHER PUBLICATIONS

CN-106211950-A, English Translation (Year: 2016).*
(Continued)

*Primary Examiner* — Ryan D Walsh
(74) *Attorney, Agent, or Firm* — Wenderoth, Lind & Ponack, L.L.P.

(57) ABSTRACT

An object of the present invention is to make it possible to easily evaluate silage fermentation quality on site or the like. In one embodiment of the present invention, a gas generated from silage is applied to a surface stress sensor, and the amount of either one of organic acids and nitrogen-containing compounds contained in the silage is determined. The surface stress sensor can detect trace components in a gas by (Continued)

a simple device configuration and in simple procedures. Therefore, by utilizing the fact that relationship between the content of these components and the fermentation quality is known, the evaluation of fermentation quality can be easily realized by the above measurement.

20 Claims, 23 Drawing Sheets

(56) References Cited

U.S. PATENT DOCUMENTS

| | | | |
|---|---|---|---|
| 2017/0184556 | A1 | 6/2017 | Toffoli et al. |
| 2020/0075134 | A1 | 3/2020 | Shiba et al. |
| 2021/0199563 | A1 | 7/2021 | Minami et al. |

FOREIGN PATENT DOCUMENTS

| | | |
|---|---|---|
| JP | 2019-128312 | 8/2019 |
| WO | 2011/148774 | 12/2011 |
| WO | 2018/101128 | 6/2018 |
| WO | 2019/244613 | 12/2019 |

OTHER PUBLICATIONS

Communication pursuant to Article 94(3) EPC issued Nov. 27, 2024 in European Patent Application No. 21 779 992.3.
Extended European Search Report issued Apr. 15, 2024 in corresponding European Patent Application No. 21779992.3.
Giorgio Masoero et al., "Development of near infrared (NIR) spectroscopy and electronic nose (EN) techniques to analyse the conservation quality of farm silages", Journal of Food Agriculture & Environment, vol. 5, No. 1, pp. 172-177, Jan. 2007.
Genki Yoshikawa et al., "Nanomechanical Membrane-type Surface Stress Sensor", Nano Letters, vol. 11, pp. 1044-1048, 2011.
Fabian Ross et al., "Rating of silage quality using chemosensor-system", Cropping and Machinery, Landtechnik, vol. 65, No. 6, pp. 456-458, 2010.
Notice of Reason for Refusal dated Apr. 4, 2023 in corresponding Japanese Patent Application No. 2022-511916, with English translation.
Office Action issued Mar. 12, 2025 in corresponding Chinese Patent Application No. 202180026952.9, with English-language translation.
International Search Report issued May 25, 2021 in International Application No. PCT/JP2021/011325.
Kida et al., "Discussion of Silage Smell Measurement Method", Glassland Science, Sep. 21, 2002, vol. 48, suppl., pp. 204-205, with English machine translation.
Subsistence Feed Quality Assessment Study Group, ed., "Quality Assessment Guidebook for Crude Feed", revised edition, Japan Grassland and Livestock Seed Association, 2001, with English machine translation.
Minami-Nemuro District Farming Improvement Council, "The Silage", special edition, 7. How do I check the fermentation quality of silage?, The Nemuro Center for Improving and Popularizing Agriculture, Documents for Farming Improvement, vol. 26, 1997, with English machine translation.
Press Release, The Yomiuri Shimbun, Jan. 14, 2021, with English machine translation.
Press Release, The Nihon Keizai Shimbun (Nikkei), Jan. 16, 2021, with English machine translation.
Press Release, The Tokyo Shimbun, Feb. 5, 2021, with English machine translation.

* cited by examiner

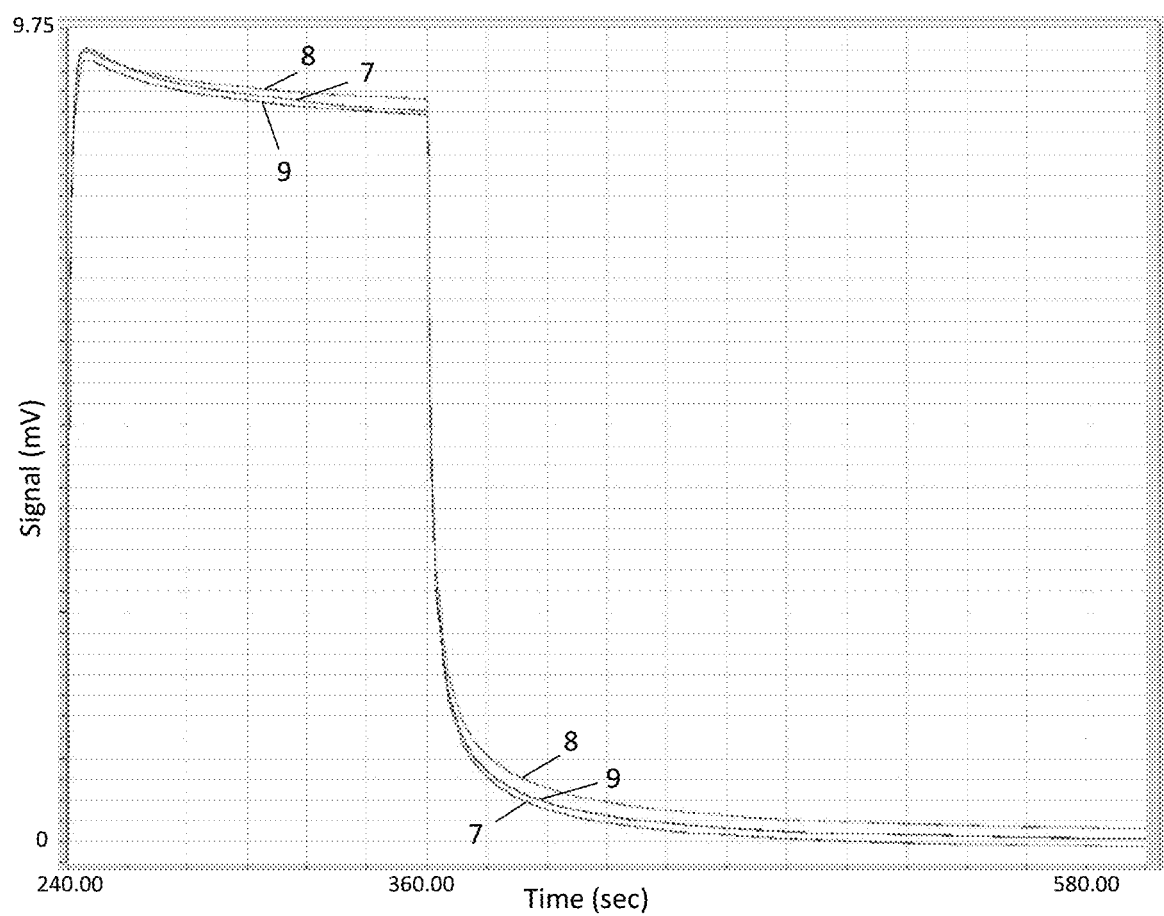

EVALUATION METHOD AND EVALUATION DEVICE FOR SILAGE FERMENTATION QUALITY

TECHNICAL FIELD

The present invention relates to silage mainly used as feed for cattle, and particularly to evaluation of silage fermentation quality during production process or storage of the silage.

BACKGROUND ART

A large amount of silage obtained by fermenting plants such as pasture grass, Gramineae family, and legume, waste from food processing is used as the feed given to ruminants such as cattle and other herbivores that are raised. Fermentation during production of the silage is mainly lactic acid fermentation, but fermentation other than the lactic acid fermentation also proceeds depending on fermentation conditions and subsequent storage conditions, and in some cases, decay can occur. The silage obtained is not preferred by the ruminants when an increase in carboxylic acids having a large number of carbon atoms such as a butyric acid and a valeric acid, or an increase in volatile basic nitrogen such as ammonia occurs in the silage due to a deterioration of fermentation quality, that is, for example, fermentation other than the lactic acid fermentation or decay. Further, when the ruminants ingest such low quality silage, their health can be possibly impaired. Therefore, it is important for the livestock industry to inspect and control the silage fermentation quality in the process of production, storage, distribution, and use of the silage.

Current methods for evaluating the silage fermentation quality include methods using chemical analysis and methods using human senses.

There is a V-score as a currently widely used index among the indexes of evaluation using the chemical analysis (Non Patent Literature 1). The V-score is evaluated on a maximum scale of 100 points for the fermentation quality, with 50 points allocated as the value of ammonia nitrogen content (VBN: volatile basic nitrogen)/total nitrogen content (TN: total nitrogen), the smaller the better; and with the remaining 50 points allocated to organic acids (VFA: volatile fatty acids). The points regarding the organic acids are given such that the lower the content of the organic acids that have the same or more number of carbon atoms as butyric acid (that is, C4 or higher), the higher the points (up to 40 points); and the lower the content of acetic acid and propionic acid, the higher the points (up to 10 points). The V-score is calculated as the sum of these evaluation points.

However, it is difficult to obtain the V-score using a simple procedure/device on site because it takes a long time to obtain the result due to the use of a procedure of immersing the silage in water for several hours and analyzing the water containing the components extracted from the silage in order to obtain the V-score, and additionally, a specialized analytical instrument is also required.

As an index of evaluation other than the V-score, there is a Flieg score obtained by performing steam distillation of silage under certain conditions, titrating the organic acids which flow out, determining the contents of the lactic acid, the acetic acid, and the butyric acid as estimated values by conversion formulas, and calculating the score based on the ratio according to the weight. It is confirmed that this score is in good agreement with the value obtained by Flieg's distillation method even when the score is calculated based on the values obtained by quantifying the lactic acid and VFA by other analysis methods. The Flieg score is often used outside Japan. In Japan, an index called V2-score that does not consider basic nitrogen is also used in the same manner. However, even in the case of the Flieg score or the like, there are problems described above with respect to the V-score, and evaluation cannot be easily performed on site or the like.

Apart from this, Patent Literature 1 describes a method for evaluating the fermentation quality of silage coated with a synthetic resin film, in which a temporal change in ammonia concentration in a gas leaked to the outside of the coating is observed, and the quality level is evaluated from the increase/decrease of the concentration.

However, with this evaluation method, it takes a long period of time to obtain an evaluation result because quality evaluation is performed based on the temporal change. In view of that example, the grass right after cutting is immediately coated with a film, and then the ammonia concentration is measured, possibly every day, to observe the change in ammonia leak concentration from the first day to the thirty-third day. Naturally, such a measurement method cannot be used for applications where it is desired to immediately evaluate the silage fermentation quality. In addition, as a matter of course, the evaluation method of Patent Literature 1 measures how much the ammonia concentration has changed from raw material stage of the silage, and thus requires information on the change in concentration from the state of the raw material or at least from the start of storage. Therefore, this evaluation method cannot be applied to silage for which initial state of ammonia concentration has not been measured, or for which ammonia initial concentration information is not provided, such as silage purchased from outside or the like.

On the other hand, as fermentation quality evaluation using human senses, comprehensive evaluation is also performed, for example, from the color, tactile sensation, odor, and taste of silage. Since human olfactory sense is quite sensitive, and particularly shows a considerably high sensitivity to the organic acids, etc., it can possibly, in principle, play a central role in evaluating the fermentation quality when the evaluator is sufficiently trained. Indeed, in the case of silage with very high fermentation quality, odor is rather weak, and the olfactory sense is well suited for evaluation in such areas. On the other hand, when the fermentation quality is slightly deteriorated, the organic acids increase, and in some cases, a decay odor or the like is also present. With a too strong stimulation for the human olfactory sense, a slight difference in components cannot be identified as a difference in odor.

As described above, the fact that the olfactory sense, which plays an important role in the evaluation method using the sense, is incompatible with the silage emitting a strong odor is a major obstacle in using the human sense for the evaluation of fermentation quality.

SUMMARY OF INVENTION

Technical Problem

An object of the present invention is to evaluate the silage fermentation quality at the time by detecting a volatile component (odor) from the silage using a surface stress sensor without complicated operation, and to provide a device for such evaluation.

Solution to Problem

According to one aspect of the present invention, an evaluation method for silage fermentation quality is provided to include: applying a gas generated from silage to a surface stress sensor; and evaluating fermentation quality based on a composition of the gas generated from the silage using signals output from the surface stress sensor in response to the gas generated from the silage.

Here, the evaluation of fermentation quality based on the composition of the gas generated from the silage may be an evaluation based on the amount of at least either one of organic acids and nitrogen-containing compounds in the gas.

Further, the evaluation of fermentation quality may be performed based on a pattern of temporal changes of the signals.

Moreover, the evaluation of fermentation quality may be performed based on the evaluation of influence of the amount of butyric acid in the gas generated from the silage on the pattern of temporal changes of the signals.

In addition, the evaluation of fermentation quality may be performed based on the evaluation of influence of the amount of acetic acid in the gas generated from the silage on the pattern of temporal changes of the signals.

Further, as the gas generated from the silage, a gas obtained by passing a gas substantially not containing a component that affects the evaluation of fermentation quality through a container containing silage to be evaluated may be supplied to the surface stress sensor.

Moreover, the evaluation of fermentation quality may be performed using the signals after the supply of the gas generated from the silage to the surface stress sensor is started.

In addition, the surface stress sensor may be a membrane-type surface stress sensor.

Further, as a material of a sensitive film of the surface stress sensor, at least one selected from the group consisting of poly(methyl vinyl ether-alt-maleic anhydride), poly(2,6-diphenyl-p-phenylene oxide), and poly(4-methylstyrene) may be used.

Moreover, as a material of a sensitive film of the surface stress sensor, at least one selected from the group consisting of polymethyl methacrylate, poly(4-methylstyrene), phenyl group-modified silica/titania composite nanoparticles, octadecyl group-modified silica/titania composite nanoparticles, poly(2,6-diphenyl-p-phenylene oxide), polyvinyl fluoride, polystyrene, polycaprolactone, cellulose acetate butyrate, polyethyleneimine, and tetraethoxysilane-modified silica/titania composite nanoparticles may be used.

In addition, as the surface stress sensor, at least a first surface stress sensor using one material selected from the group as the sensitive film and a second surface stress sensor using another material selected from the group as the sensitive film may be used.

Further, the gas generated from the silage and a purge gas may be alternately applied to the surface stress sensor, and the evaluation of silage fermentation quality may be performed by using the signals corresponding to the gas generated from the silage and the signals corresponding to the purge gas.

Moreover, in addition to a time frame during which the gas generated from the silage is supplied to the surface stress sensor and a time frame during which the purge gas is supplied to the surface stress sensor, a time frame during which a predetermined reference gas is supplied to the surface stress sensor may be provided, and the signals corresponding to the reference gas may be further used in the evaluation of silage fermentation quality.

In addition, the reference gas may be a gas generated from a liquid or a solid.

Further, the gas generated from the silage may be supplied to an additional gas sensor, and the evaluation of silage fermentation quality may be performed based on the signals from the surface stress sensor and signals from the additional gas sensor.

According to another aspect of the present invention, an evaluation device for silage fermentation quality is provided to include: at least one surface stress sensor; a first gas flow path for supplying a sample gas generated from silage to be measured; and a second gas flow path for supplying a purge gas not containing a gas component to be measured, in which the sample gas supplied from the first gas flow path and the purge gas supplied from the second gas flow path are alternately switched and supplied to the at least one surface stress sensor to generate signals from the at least one surface stress sensor, thereby performing any of the evaluation methods for silage fermentation quality.

Here, an additional gas sensor and an additional gas flow path for supplying the sample gas to the additional gas sensor may be provided, and the evaluation of silage fermentation quality may be performed based on the signals from the at least one surface stress sensor and the signals from the additional gas sensor.

According to still another aspect of the present invention, an evaluation device for silage fermentation quality is provided to include: at least one surface stress sensor; a first gas flow path for supplying a sample gas generated from silage to be measured; a second gas flow path for supplying a purge gas not containing a gas component to be measured; and a third gas flow path for supplying a reference gas having a predetermined component composition, in which the sample gas supplied from the first gas flow path, the purge gas supplied from the second gas flow path, and the reference gas supplied from the third gas flow path are switched in a predetermined order and supplied to the at least one surface stress sensor to generate signals from the at least one surface stress sensor, thereby performing any of the evaluation methods for silage fermentation quality.

Here, an additional gas sensor and an additional gas flow path for supplying the sample gas to the additional gas sensor may be provided, and the evaluation of silage fermentation quality may be performed based on the signals from the at least one surface stress sensor and the signals from the additional gas sensor.

Advantageous Effects of Invention

In the present invention, the composition of the organic acids, which is one of the important evaluation items regarding the silage fermentation quality, for example, the ratio between the butyric acid and the acetic acid in the gas volatilized from silage, can be easily evaluated. Accordingly, this makes it possible to easily obtain the ratio of the C2 and C3 components to the C4 or higher components, as well as the amounts of the C2 and C3 components in the organic acids generated by the silage fermentation. Further, it is also possible to detect nitrogen-containing volatile components, and when there is a substance correlated with fermentation quality other than the organic acids and nitrogen-containing volatile components, such a substance can also be detected. In the present invention, the silage fermentation quality can be comprehensively evaluated based on output signals from a plurality of surface stress sensors coated with sensitive films capable of detecting the organic acids, the volatile basic nitrogen, etc. with high sensitivity. The surface stress sensor can detect a plurality of target substances via one sensitive film by selecting an appropriate sensitive film material, but since the response of the sensor to each target substance can be made different in amplitude and response waveform, it is possible to obtain a fermentation quality evaluation value in which parameters corresponding to a plurality of target substances are appropriately combined by combining a plurality of surface stress sensor outputs.

BRIEF DESCRIPTION OF DRAWINGS

FIG. 23 shows graphs indicating temporal changes (unit: second) of signals (unit: mV) from an MSS of ChN when measurement was performed in the same procedure as in the case of FIG. 13 for three kinds of silage samples to be measured, which are identical to those in the measurement in FIG. 13.

DESCRIPTION OF EMBODIMENTS

Figure 1:
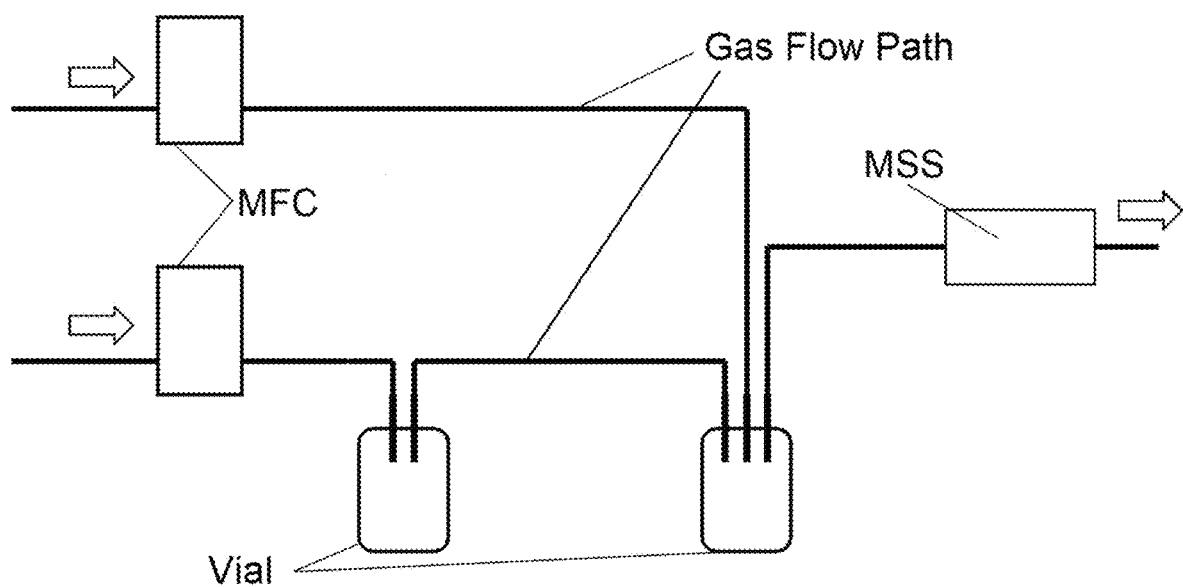
FIG. 1 is a diagram showing a schematic configuration of a measurement system that can be used in the present invention.

Since various components generated along with the fermentation of silage are volatilized from the silage, it is possible to evaluate the fermentation quality by detecting these various components. Important items for evaluating the silage fermentation quality include the amount of each organic acid contained in the silage and the ratio therebetween. Specifically:

Criterion 1: Silage having a large value of the ratio of the amount of the organic acids having 4 or more carbon atoms (hereinafter referred to as C4) to the amount of the organic acids having 2 or 3 carbon atoms (hereinafter referred to as C2 and C3, respectively) in the molecule has poor quality (evaluation from this viewpoint is also referred to as C4 evaluation); or Criterion 2: Silage having a large amount of organic acids with 2 or 3 carbon atoms also has poor quality (evaluation from this viewpoint is also referred to as C2 and C3 evaluation). The inventors of the present application have conceived the idea of evaluating the silage quality by detecting the amount of such various organic acids in silage with a surface stress sensor, and as a result of advancing the research, have completed the present invention.

According to an embodiment of the present invention, at least one surface stress sensor is provided in which a response characteristic to at least one of organic acids belonging to C2 and C3 and a response characteristic to at least one of organic acids belonging to C4 are different, and the silage is evaluated based on an output of such a surface stress sensor. More specifically, the output of the surface stress sensor is evaluated for at least one of the above criteria 1 and 2, and the silage evaluation is performed from the result.

Here, individual surface stress sensors may be provided corresponding to individual organic acids. Alternatively, it is also possible to use fewer surface stress sensors than the kinds of organic acids that should be detected, utilizing the fact that the surface stress sensors often respond to multiple species with different signal waveforms. In the latter case, the identification of the individual organic acid and the determination of the amount of the individual organic acid can be more easily realized using a simple method, such as simple pattern matching that uses an information processing device, when the response waveform is clearly different for each kind of organic acid, and the entire output of the surface stress sensor does not largely deviate from the linear superposition of the responses by the individual organic acids even when a plurality of kinds of organic acids are mixed. However, even not in such a case, and in a complicated situation where there are many parameters that affect the output signals, such as there are considerable number of kinds of organic acids that can be detected, a more accurate result can be obtained by performing machine learning using a well-known method for the relationship between output components and the amount of each component or the ratio between the amounts of a plurality of components (alternatively the evaluation score or the evaluation result category). Although such machine learning is not specifically described in the present application, it is well known that the machine learning itself is a method applicable to a wide range of technical fields, and the fact that the machine learning can be employed in an application of the surface stress sensor is described in detail in Patent Literature 2, for example.

Here, instead of evaluating the individual amounts of all the organic acids contributing to the evaluation result of silage and the ratio therebetween, the amount of a smaller number of representative organic acids or the mutual ratios may be obtained. This is because the reaction for producing these organic acids and the component composition of the raw material do not have so much freedom, and thus the amount of a certain component is not completely independently determined from the amount of other similar components. Using this, for example, the acetic acid may be used as a representative component as C2 and C3, and the butyric acid may be used as a representative component as C4. When the representative components are selected in this manner, the acetic acid and the butyric acid have the highest volatility in each group of organic acids, and thus are easily detected as a gas, which is advantageous for measurement.

It has been described above that the silage fermentation quality is evaluated by measuring the amount and ratio of various organic acids volatilized from the silage, but the components that should be measured are not limited thereto. For example, as described above, the silage fermentation quality can be evaluated by measuring not only the amount and ratio of the organic acids but also the amount and ratio of volatile nitrogen-containing compounds. Further, by obtaining the amounts and ratios between the components of both categories of the organic acids and the nitrogen-containing compounds, more accurate silage fermentation quality evaluation can be realized. Moreover, instead of measuring both the amount of organic acids and the nitrogen-containing compounds, the silage fermentation quality can be evaluated to a considerably practical extent by knowing only one of them. For example, in the Flieg score described in Non Patent Literature 2, the evaluation is performed based on the composition of organic acids such as lactic acid, acetic acid, and butyric acid. As described therein, although it depends on the silage production conditions and the fermentation conditions (for example, according to Non Patent Literature 2, when an acid addition method in which an acid is added in a production process or a low moisture silage preparation method is adopted, the difference from the V-score increases), it is possible in many cases to perform good quality evaluation well correlated with the V-score, for which nitrogen-containing compounds are also measured. In addition, even simply being able to determine the concentration of butyric acid that is reported to increase the risk of disease when consumed in large amount (45 g/day or more), is considered to meet the on-site needs. Alternatively, it is also possible to perform a more accurate and stable quality evaluation by also measuring the amount of an organic acid selected from C2 and C3 organic acids, for example, acetic acid as shown in the examples. Further, when components other than the organic acids and the nitrogen-containing compounds are useful for the evaluation of silage fermentation quality, the silage quality evaluation can be performed by measuring components other than the organic acids and the nitrogen-containing compounds in addition to or instead of the measurement of the organic acids and/or the nitrogen-containing compounds.

By selecting an appropriate sensitive film material, the surface stress sensor can obtain response signals (also referred to as signals) for the plurality of target substances from one sensitive film in a form that they are superimposed. In other words, by appropriately selecting the sensitive film materials for the plurality of target substances, the amplitudes and response waveforms can be made different from each other in the response of the surface stress sensor to each target substance. Accordingly, by combining a plurality of surface stress sensor outputs, it is possible to obtain a fermentation quality evaluation value obtained by appropriately combining parameters corresponding to the plurality of target substances. At this time, as described above, by performing pattern matching and machine learning of the outputs of the surface stress sensors, features are appropriately extracted from these outputs, and silage fermentation quality evaluation based on a larger number of parameters than the number of surface stress sensors can be realized only by using a relatively small number of surface stress sensors. Naturally, for example, although not limited thereto, when another kind of gas sensor is available that is particularly convenient for detecting a specific component present in the gas generated from the target to be measured and is useful for silage quality evaluation, such a gas sensor can be used in combination with the surface stress sensor as necessary.

In the present invention, the surface stress sensor is used to measure the gas generated from the sample to be measured. An overview of a measurement system configuration that can be used for this purpose is shown in FIG. 1. In the schematic configuration shown in FIG. 1, a Membrane-type Surface stress Sensor (MSS) is used as the surface stress sensor, but of course this does not lose generality. In the schematic configuration shown in FIG. 1, instead of a gas component that should be measured, an inert gas (also referred to as a purge gas or a reference gas) that has the minimum effect on the measurement of such a gas component is supplied to each of the two gas flow paths as indicated by outlined arrows from the left side of the diagram. As the purge gas, for example, nitrogen gas or atmospheric air can be used, but the nitrogen gas was used here. Note that when a simple measurement is performed using the atmospheric air or the like as the purge gas, there is a possibility that a gas affecting the evaluation of fermentation quality, such as organic acids or ammonia generated from the silage, is slightly mixed in the atmospheric air at the measurement site. In such a case, if the influence of a concentration of such a mixed gas on the quality evaluation result does not adversely affect the realization of the intended measurement accuracy (such a case is referred to as "substantially free of components that affect the evaluation of fermentation quality"), such mixing of gas can be ignored. The flow rates of the gas flows of the two systems are controlled by a mass flow controller (MFC) provided for each gas flow path. Specifically, the gas flows in the two gas flow paths are alternately switched at desired time intervals, and the gas flow rate is controlled to be constant on the time axis. Additionally, as a matter of course, the control of the gas flow is not limited to the MFC, and various pumps, etc. can be used.

In FIG. 1, the gas flow path shown on the upper side performs purge processing for initializing the MSS by desorbing various gases diffused in the sensitive film applied to the surface of the MSS by supplying a purge gas not containing a gas component that should be measured to the MSS. On the other hand, the gas flow passing through the gas flow path on the lower side of FIG. 1 is supplied to the MSS in a state of containing a gas component volatilized from the sample in the vial installed immediately after the MFC. Naturally, in a case where the sample is gaseous from the beginning, or in a case where gas volatilized and evaporated from a liquid or solid sample is given to the measurement system, a configuration not using the vial can be adopted. The gas flows from the two gas flow paths are joined in another vial and then supplied to the MSS. Further, since the rate of gas adsorption/desorption by the sensitive film on the MSS surface is affected by temperature, it is preferable to maintain the temperature at a desired value by containing the measurement system shown in FIG. 1 in a thermostatic chamber, an incubator, or the like. In the examples described below, measurement was performed with the entire measurement system contained in an incubator. In addition, the present system includes an information processing device that realizes an evaluation method described below by controlling the operations of various devices in the system such as the MFC, and performing various processes such as capturing, recording, and analyzing signals from the surface stress sensor, and further includes an interface and a communication device for exchanging information, commands, etc., with an external device or the like, which are omitted in the drawings.

Figure 2:
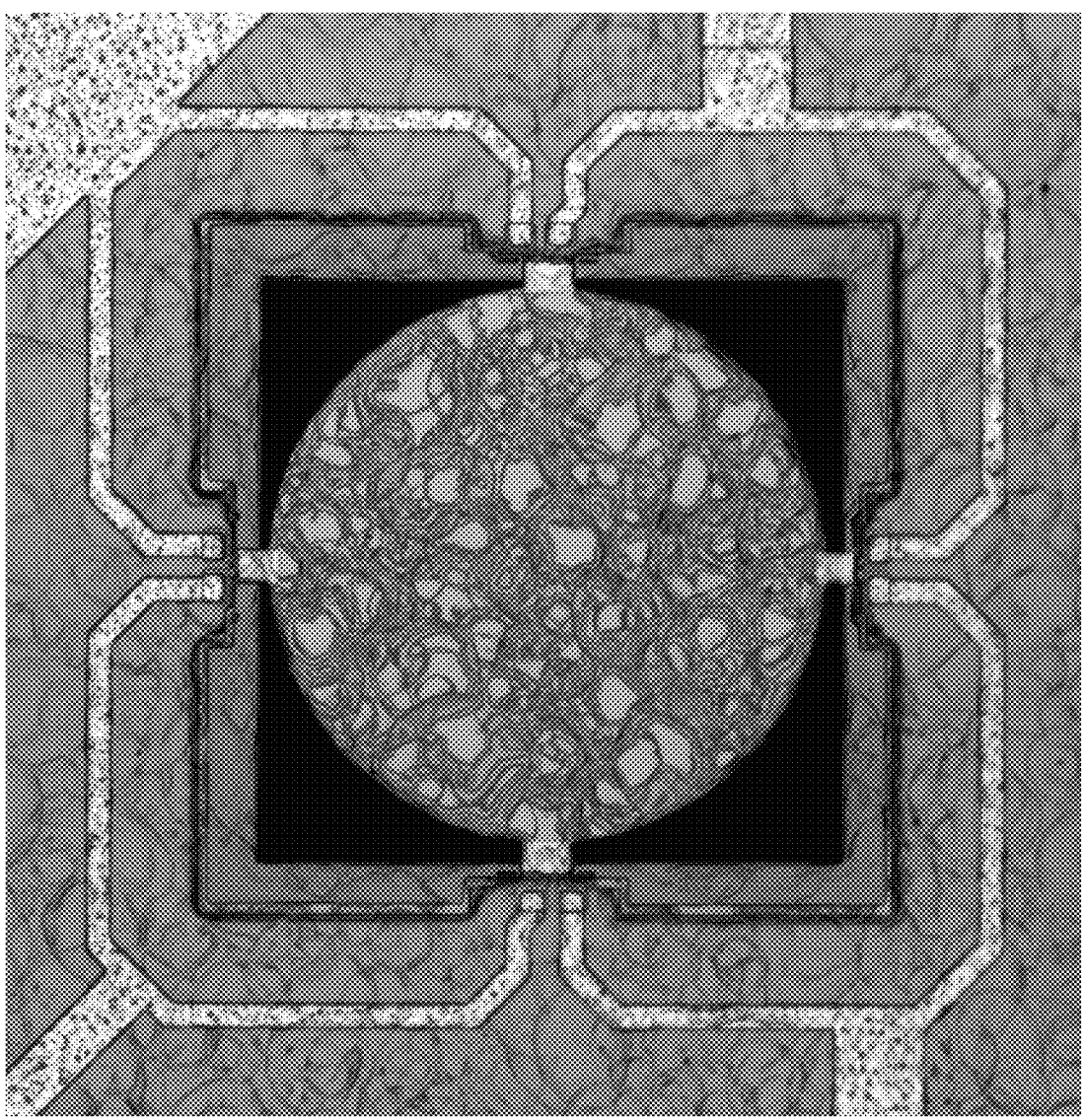
FIG. 2 is an illustration showing an example of an optical microscope photograph of an MSS.

An example of an optical microscope photograph of the MSS is shown in FIG. 2. The MSS shown in FIG. 2 is formed of a silicon wafer cut out from a silicon single crystal, which is used in the field of semiconductor element technology, and a central circular portion (which may have another shape such as a square) is connected and fixed to a surrounding frame-shaped portion at four positions of the circular portion, that is, upper, lower, left, and right. The gas component applied to the MSS is adsorbed to and desorbed from the sensitive film applied to the surface of the circular portion, whereby the surface stress applied to the MSS is concentrated on these four fixed regions, leading to a change in electric resistance of the piezoresistive elements provided in these fixed regions. These piezoresistive elements are interconnected by conductive regions (shown as sand-grain regions in FIG. 2) provided in the frame-shaped portion to form a Wheatstone bridge. A voltage is applied between two opposing nodes of the Wheatstone bridge, and a voltage appearing between the remaining two nodes is extracted to the outside of the MSS as signals output from the MSS and a required analysis is performed. The structure and operation of such MSS are described in detail in, for example, Patent Literature 3. In FIG. 2, the sensitive film is widely applied to the surface of the MSS chip including not only the circular portion of the MSS but also the frame-shaped portion. This is a state seen when the sensitive film is applied by spray coating, but since the sensitive film applied to the frame-shaped portion or the like does not substantially contribute to the sensor output signals, the sensitive film can be used as a sensor without any problem even when applied in this manner. Of course, it is also possible to use an MSS in which a sensitive film is applied only to a circular portion by an inkjet, a dispenser, or the like.

Figure 3:
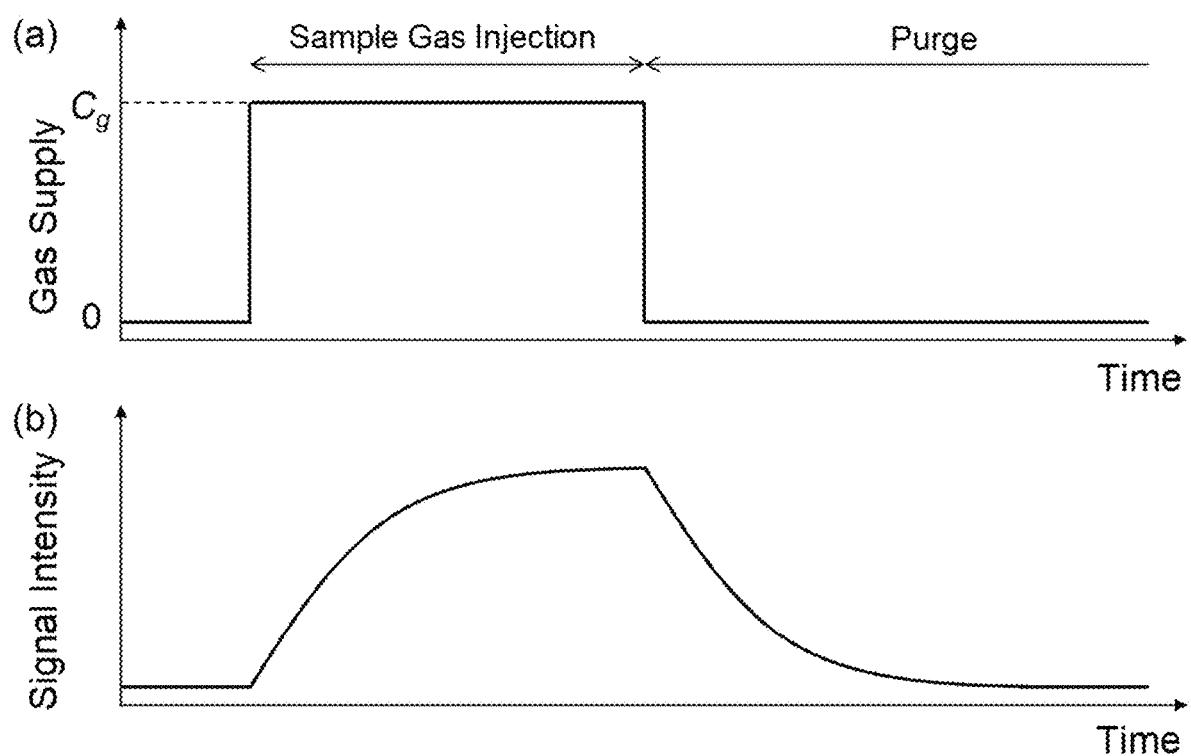
FIGS. 3(a) and (b) are conceptual diagrams for explaining temporal changes in signal intensity when the sample gas is applied to a surface stress sensor such as an MSS.

FIG. 3 shows a conceptual diagram of the temporal change in signal intensity when the sample gas is applied to the surface stress sensor such as the MSS. FIG. 3(a) shows whether the gas supplied to the MSS is the sample gas or the purge gas on the time axis. Specifically, the concentration of the gas to be measured in the gas supplied to the MSS is the concentration Cg, larger than 0, during sample gas injection period in which the sample gas is supplied, and the sample gas concentration is 0 during purge period in which the purge gas is supplied to cause the sample gas in the downstream gas flow path to flow away and the sample gas component adsorbed to the sensitive film of the MSS (and a tube wall or the like of the gas flow path) is desorbed. FIG. 3(b) shows the signal intensity from the MSS when the gas kind shown in FIG. 3(a) is switched, with the time axis aligned with that of FIG. 3(a). Although the signal intensity is governed by many factors, basically, the main factor is the rate of adsorption/desorption of the component between the gas and the sensitive film caused by the difference between the component concentration in the gas in the vicinity of the sensitive film on the MSS and the concentration of the same component on the sensitive film surface. Therefore, the same temporal change in signal intensity starts immediately after gas switching shown in FIG. 3(a) and becomes close to a curve that asymptotically approaches the upper and lower saturation values exponentially. FIG. 3(b) shows the curve in an ideal case. The actual shape of the curve, the maximum value of the curve, etc., change considerably depending on the rate of adsorption to/desorption from the sensitive film and the kind of the component adsorbed to/desorbed from the sensitive film, and the change range of the signals is also greatly different in many cases. Further, the signals can show a more complicated temporal change due to viscoelastic property of the sensitive film, the diffusion of the target gas to be measured into the sensitive film, the physicochemical interaction between the sensitive film material and the gas to be measured, or the like. In this manner, the amount and concentration of each main component in the sample, the ratio between the plurality of components, etc., can be obtained on the basis of the temporal change, the amplitudes, etc., of the signals from the MSS. Specifically, there is a sensitive film material that gives signals suitable for C4 evaluation, and there is also a sensitive film material that gives signals suitable for C2 and C3 evaluation. Accordingly, an evaluation based on desired characteristics of the silage can be performed by measuring gas obtained from the silage using the surface stress sensor to which a material appropriately selected from these materials is applied alone, or performing similar measurement using a plurality of kinds of surface stress sensors to which different materials are respectively applied.

Here, materials forming the sensitive films have various adsorption/desorption characteristics, and there are also sensitive film materials showing a response deviating from the simplified model described above. However, it can be said that, when analyzing the response of the surface stress sensor or on other occasions, performing the first examination using the above model is useful in many cases.

Although FIG. 3 shows that the sample gas is supplied to the MSS only once, in the measurement using the surface stress sensor such as the MSS, it is common to repeat the measurement as shown in FIG. 3 over a plurality of times by alternately switching and supplying the sample gas and the purge gas. Hereinafter, the set of sample gas injection followed by purge is referred to as a measurement cycle. Further, the sample gas injection period and the purge period are often set to have the same time length unless there is a circumstance such as a large difference between an adsorption rate and a desorption rate of a certain component in the sample gas. However, the purge period may be longer than the sample gas injection period when a satisfactory result is obtained by sufficiently desorbing the sample gas components adsorbed to the sensitive film. Specifically, there is a possibility that the discrimination accuracy is adversely affected by setting the length ratio between the sample gas injection period and the purge period to 1:1, as described in the example, due to insufficient desorption in the purge period, and thereby baseline fluctuation of the signals increases. In this case, the purge period can be made longer, for example, the ratio can be set to 1:2.

In the above description, the measurement based on measurement sequence for switching between the sample gas and the purge gas is performed, but the present invention is not limited thereto. For example, a measurement for another gas (reference gas) which is contained in the sample gas and whose concentration can affect the evaluation of silage fermentation quality can be inserted into the measurement sequence to perform the evaluation of fermentation quality based on the signals from the switching measurement of the three kinds of gases. As such a reference gas, for example, assuming a typical silage, a gas having the same component composition as the sample gas component generated from such silage may be used. Alternatively, various compositions can be set as necessary, for example, a gas having the same composition for some components (for example, a component or the like for which a slight difference in component amount is desired to be measured with particularly high accuracy) of the sample gas assumed as described above may be used as a reference gas. Then, the supply sequence of these three kinds of gases is appropriately set in consideration of various requirements and restriction conditions in measurement. For example, measurement sequences including repetitions of a gas supply time frame as follows are conceivable:

A. Supply the purge gas→[supply one of either the sample gas or the reference gas→supply the purge gas-→supply the other gas (the sample gas or the reference gas)→supply the purge gas] (or repeat the sequence within the square brackets [ ])

B. Supply the purge gas→[alternately supply the sample gas and the reference gas→supply the purge gas] (or repeat the sequence within the square brackets [ ])

C. Supply the purge gas→[repeat alternate supply of either one of the sample gas or the reference gas, and the purge gas→supply the purge gas→repeat alternate supply of the other gas (the sample gas or reference gas) and the purge gas] (or repeat the sequence within the square brackets [ ])

Other than these, various gas supply sequences for the gas supply time frames are also possible. In any gas supply sequence, since it is considered that measurement conditions such as temperature, gas pressure and flow rate, and the temporal change in sensor characteristics do not greatly change in a series of measurement sequences, it is possible to accurately measure a slight difference in composition between the sample gas and the reference gas by comparing the two, and it is also possible to improve measurement stability such that, for example, an influence of disturbance on a measurement result can be reduced.

In the case of having to use the reference gas, a gas flow path for the reference gas is added to the gas supply system of the measuring device, but this can be easily realized using various existing techniques for the gas supply system. For example, the reference gas can be prepared in a gaseous state from the beginning, or may be introduced into the gas supply system by being evaporated from a liquid or a solid similarly to the sample gas. Moreover, when the reference gas is provided, another gas such as a purge gas may be mixed with the initially prepared gas or the gas generated from the liquid or solid. Additionally, these three gas flow paths of the system need to be finally joined. Three flow paths may be joined at one place, or the gas flow paths may be configured so that the upstream side of the sample gas flow path is partially divided to form a reference gas flow path, the reference gas is introduced into the reference gas flow path, and then both gas flow paths are joined before the junction with the purge gas.

The sensitive film material is not intended to be limited thereto, but in one exemplary embodiment, at least one selected from the group consisting of the poly(methyl vinyl ether-alt-maleic anhydride), the poly(2,6-diphenyl-p-phenylene oxide), and the poly(4-methylstyrene) can be used.

Further, in another embodiment, at least one selected from the group consisting of the polymethyl methacrylate, the poly(4-methylstyrene), the phenyl group-modified silica/titania composite nanoparticles, the octadecyl group-modified silica/titania composite nanoparticles, the poly(2,6-diphenyl-p-phenylene oxide), the polyvinyl fluoride, the polystyrene, the polycaprolactone, the cellulose acetate butyrate, the polyethyleneimine, and the tetraethoxysilane-modified silica/titania composite nanoparticles can be used. As the material selected from these groups, one material may be used alone, or a plurality of kinds of materials may be used in combination by using a first MSS that uses the selected one material for the sensitive film and a second MSS that uses another material selected from the groups as the sensitive film. Naturally, the number of MSS used in the case of using the plurality of kinds of materials in combination is not limited to two, and it is also possible to use a third, a fourth or more MSS and to use different materials selected from the groups for the sensitive film of each MSS.

EXAMPLES

Hereinafter, the present invention will be described in more detail with reference to the examples. Additionally, it should be noted that the following examples are not intended to limit the present invention but to help understanding thereof.

Example 1

In Example 1, a measurement system having a schematic configuration shown in FIG. 1 contained in an incubator was used, and measurement was performed using aqueous solutions of organic acids contained in a large amount in silage; and silages of various qualities, which were contained in vials as samples to be measured. The measurement was performed with the temperature of the incubator set to three different temperatures of 20° C., 30° C., and 45° C., but since the discriminability (the degree to which the difference of the sample appears as the difference of the MSS response signal waveform) was the best in the case of 30° C., the results of the measurement at such temperature setting are shown below. Further, the measurement was performed at two flow rates of the sample gas and the purge gas of 10 sccm and 30 sccm, and the flow rate of 10 sccm was better in discriminability. However, as should be noted here, the discriminability is considered to be greatly affected by any of the divergence speed of the sample gas, the adsorption speed of the sensitive film, and the flow rate. Therefore, the above reference to discriminability is a conclusion that the discriminability is higher at 10 sccm than at 30 sccm in the current measurement system, and for example, if the thickness of the sensitive film or the amount of sample to be collected changes, the optimal flow rate can change. In addition, 10 sccm that can suppress heat generation from the pump has a great advantage in avoiding the temporal change in the gas flow path temperature that affects the gas temperature. In the measurement system used in Example 1, countermeasures against heat, such as attachment of a cooling fan, were not taken for the gas flow path, and it can be said that the above flow rate is a suitable measurement condition for such a measurement configuration. The measurement was performed in two sampling time periods (time length for performing the sample gas injection in each measurement cycle) of 30 seconds and 120 seconds, but there was no difference in the discriminability. Hereinafter, data with the sampling time of 120 seconds will be described. Here, the measurement was performed with the ratio of the sampling time to the purge time (the time for supplying the purge gas to the MSS and performing the purge in each measurement cycle) set to 1:2. In the experiment performed by the inventors of the present application, it has been confirmed that when the purge time is shortened such that the ratio between the sampling time and the purge time is set to 1:1 or the like, the purge, that is, the desorption of the component adsorbed to the sensitive film on the MSS during the sample gas injection becomes insufficient, and the fluctuation of the baseline increases. For this reason, when the purge is performed only for a short time, there is a possibility that the discrimination accuracy is adversely affected. In actual measurement, an increase in measurement time causes not only inconvenience such as a decrease in measurement throughput, but also causes a problem that it is often difficult to stabilize various parameters (the flow rate, the gas pressure, the temperature, etc.) of the environment inside and outside the measurement system for a long time, or a problem of an increase in size and price of the measurement system. Further, since the measurement system usually includes an active component such as a pump, a temperature change over a long period of time due to heat generated from the active component can also adversely affect accuracy. Accordingly, as for the measurement cycle time allocation in the present invention, it is desirable that the sampling time should be as short as possible within a range in which an effective signal value can be obtained, and the purge time should be as long as possible. Alternatively, as a countermeasure in a case where the baseline fluctuation becomes a problem, it is also possible to remove or reduce the adverse effect due to a short-time purge by, for example, preparing reference silage in which the amount of the component affecting the quality is a predetermined value, and then measuring the reference silage and performing calibration for each measurement.

As aqueous solutions of organic acids, a 1% aqueous solution for each organic acid was prepared, and these aqueous solutions were individually measured. In addition, the silage was measured by containing a predetermined weight of silage in the vial as it was without particularly adding water or the like.

Further, for various kinds of silages to be measured, the organic acids contained in each silage were separately measured following a V-score measuring method. Additionally, organic acids such as malic acid and succinic acid, which are not used for calculating the V-score, were also measured. The results are shown in the following table.

TABLE 1

| | | Organic acids % (w/v) | | | | | | | | |
|---|---|---|---|---|---|---|---|---|---|---|
| Sample No. | pH | Malic acid | Succinic acid | Lactic acid | Acetic acid | Propionic acid | C2 + C3 | Butyric acid | Isovaleic acid | Valeic acid |
| 1 | 4.88 | 0.00 | nd | nd | 0.52 | 0.24 | 0.86 | 0.36 | 0.07 | 0.05 |
| 2 | 4.31 | 0.20 | 0.05 | nd | 1.85 | 0.10 | 1.95 | nd | nd | nd |

TABLE 1-continued

| | | Organic acids % (w/v) | | | | | | | | |
|---|---|---|---|---|---|---|---|---|---|---|
| Sample No. | pH | Malic acid | Succinic acid | Lactic acid | Acetic acid | Propionic acid | C2 + C3 | Butyric acid | Isovaleic acid | Valeic acid |
| 3 | 4.21 | 0.06 | nd | 0.55 | 0.63 | nd | 0.63 | nd | nd | nd |
| 4 | 3.72 | 0.14 | nd | 2.39 | 0.34 | nd | 0.34 | nd | nd | nd |
| 5 | 3.78 | 0.17 | nd | 1.88 | 0.13 | nd | 0.13 | nd | nd | nd |
| 6 | 4.02 | 0.11 | nd | 0.94 | 1.16 | 0.15 | 1.32 | 0.02 | nd | nd |

Further, the amounts of nitrogen-containing compounds in these silages were measured, based on which along with the above organic acid measurement results, the V-scores were calculated as shown in the table below.

TABLE 2

| | | Breakdown of V-SCORE | | |
|---|---|---|---|---|
| Sample No. | v-score | C2 + C3 evaluation | C4 evaluation | VBN evaluation |
| 1 | 7 | 5 | 9 | 0 |
| 2 | 40 | 0 | 40 | 0 |
| 3 | 90 | 7 | 40 | 43 |
| 4 | 92 | 9 | 40 | 43 |
| 5 | 97 | 10 | 40 | 47 |
| 6 | 61 | 1 | 38 | 21 |

The MSS used was actually an aggregate including a plurality of MSS each coated with a different sensitive film material, but among them, MSS (the number is ChA) using the poly(methyl vinyl ether-alt-maleic anhydride) as a sensitive film material showed the best discriminability. Hereinafter, description will be mainly made based on the signals output from ChA. Additionally, since signals from two of the remaining MSS were also effective for discrimination, these signals will be appropriately referred to as ChB (sensitive film material: poly(2,6-diphenyl-p-phenylene oxide)) and ChC (sensitive film material: poly(4-methylstyrene)) for description.

Figure 4:
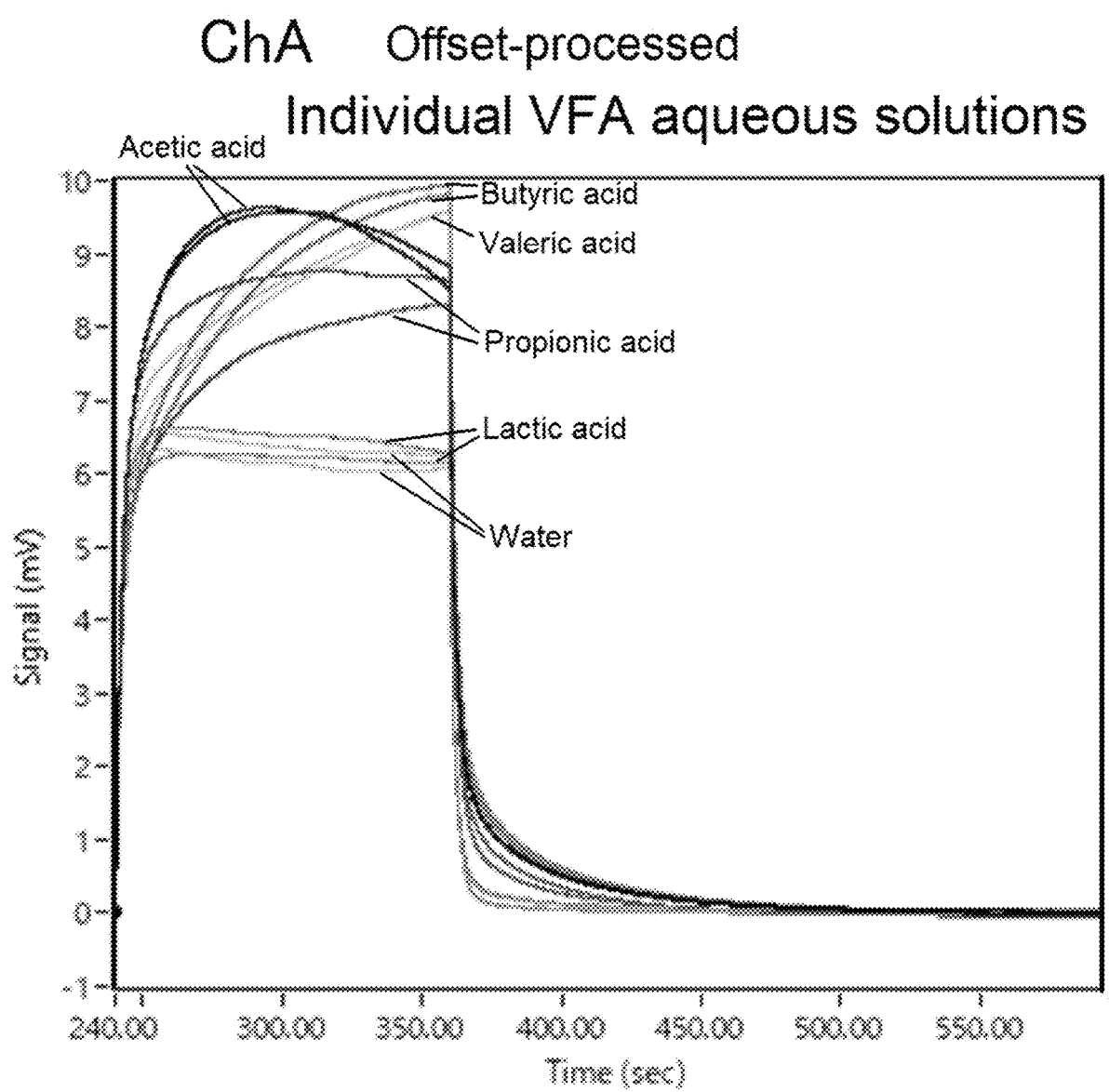
FIG. 4 shows graphs indicating temporal changes (unit: second) of signals (unit: mV) from an MSS of ChA when a 1% aqueous solution of each organic acid was contained in a vial and measured with a measuring device shown in FIG. 1 in Example 1.

FIG. 4 shows temporal changes (unit: second) of signals (unit: mV) from the MSS of ChA when the 1% aqueous solution of each organic acid was contained in a vial and measured with the measuring device shown in FIG. 1. Here, the acetic acid, the butyric acid, the lactic acid, the propionic acid, and the valeric acid were measured as organic acids. Further, water before dissolving the organic acids was also measured as a comparative object. In the measurement sequence, first, the purge gas was caused to flow for 240 seconds, then the sample gas was caused to flow for 120 seconds, and then the purge gas was caused to flow again for 240 seconds. Further, the flow rates of the purge gas and the sample gas were set to 10 sccm. Moreover, as can also be seen from FIG. 4, the measurement was made twice for each sample and both results were plotted here. In the measurement shown in FIGS. 5 and 6, the same measurement sequence and flow rate were used. As can be seen from FIG. 4, when the measurement was performed using vapor from an aqueous solution of an individual organic acid as the sample gas, the signals for the acetic acid were saturated within a short time, and after about 60 seconds from the start of sample gas injection, a unique signal change (the temporal change) was shown in which the signals greatly decreased. On the other hand, the signals for other organic acids such as the butyric acid showed a tendency to stay almost constant and slightly decrease after saturation; or increased slowly and therefore continued to increase even at the end of sample gas injection period (120 seconds after the start of sample gas injection). Additionally, since the lactic acid among the organic acids measured here is not volatile, its signals were almost identical to those of water.

Figure 5:
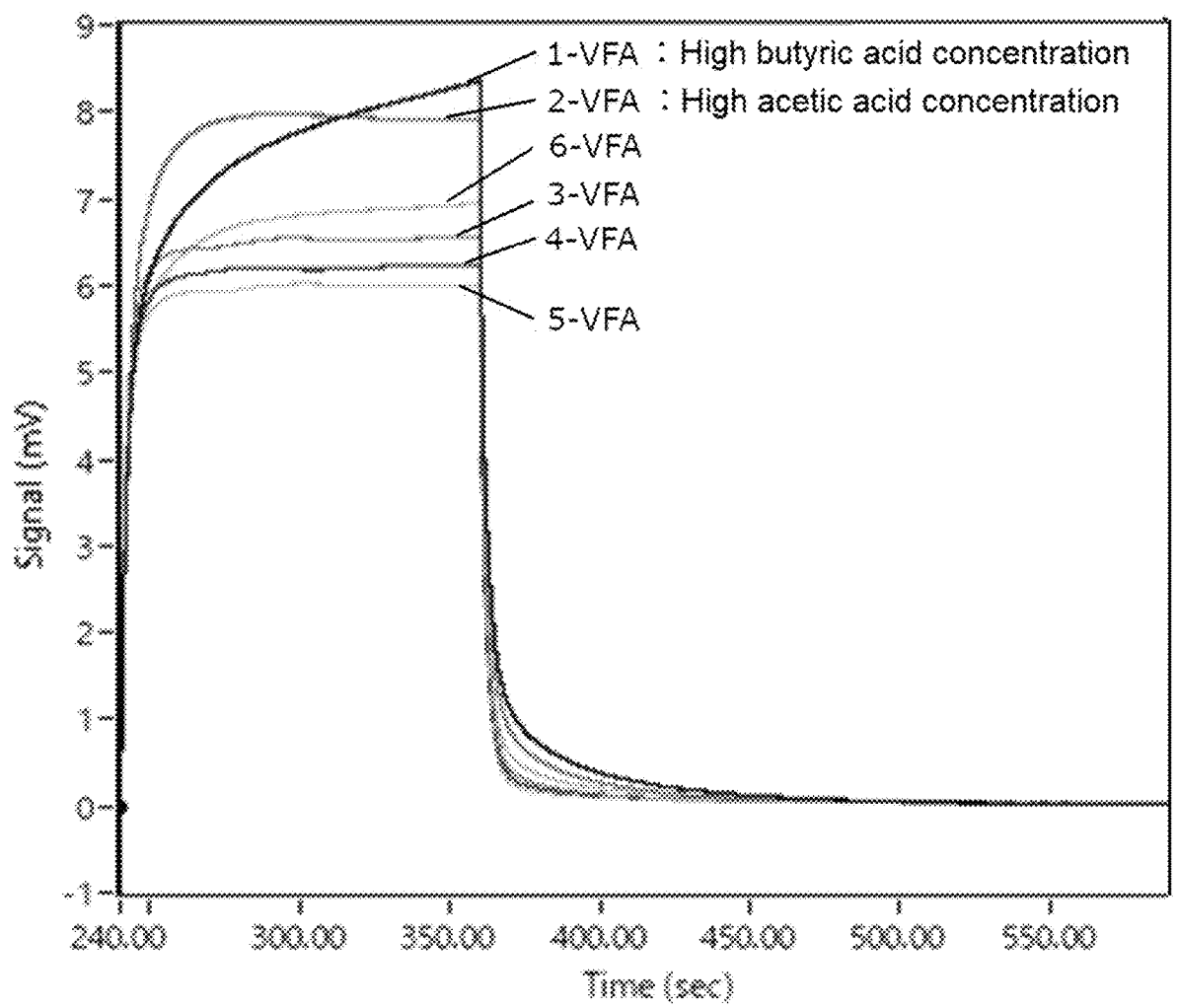
FIG. 5 shows graphs indicating results of measuring mixed organic acid aqueous solutions (simulated silage aqueous solutions) having the same organic acid compositions as extracts of silages to be measured in the same procedure as in the case of FIG. 4.

Next, a measurement was performed to verify whether, when a gas including a plurality of organic acids such as the sample gas generated from the actual silage is measured, signals are obtained from the MSS in a form in which the responses of the individual components are relatively linearly maintained and superimposed, or the contributions of the individual components cannot be easily separated when looking at the signals from the MSS since these responses mutually affect each other. The measurement was performed, in the same procedure as in the case of FIG. 4, for mixed organic acid aqueous solutions (simulated silage aqueous solutions) having the compositions of the organic acids in the extracts of the silage samples 1 to 6 shown in the above table, and the results thereof are shown in FIG. 5. Here, each simulated silage is represented by adding a character string "-VFA" after the sample number of the corresponding silage.

By comparing FIG. 5 with FIG. 4, it has been confirmed that for the sensitive film used in the MSS of ChA, as far as the measurement of the gas generated from the sample of the organic acid composition of the silage is concerned, the signals show almost the same temporal changes as those obtained by linearly superimposing the signals for the individual organic acid gases. In other words, the signals for 1-VFA corresponding to the sample 1 with a high concentration of butyric acid showed a slow rise similar to those for the gas from a pure aqueous solution of butyric acid, whereas the rise of the signals for 2-VFA corresponding to the sample 2 with a low concentration of butyric acid but a high concentration of acetic acid was as steep as those for the gas from a pure aqueous solution of acetic acid. In addition, after the signals reach the peak, a relatively large decrease in the signal value observed in the signals for the gas from pure acetic acid is shown in a slightly alleviated form by the superimposition of the signals for other gases that do not change much from the middle of the sample gas injection period. Further, it was confirmed that the signals for 3-VFA, 4-VFA, and 5-VFA, which respectively correspond to the samples 3, 4, and 5 having a zero butyric acid concentration and a low acetic acid concentration, all rose in a relatively short time and then maintained almost constant values. The reason is considered as that there is no influence of butyric acid, for which the increase in signals is the slowest, and the influence of acetic acid is also very small, for which the signal turns to a rapid decrease in a relatively short time. Further, it was also confirmed that the signals for sample 6-VFA corresponding to the sample 6 having a slightly higher concentration of acetic acid than those of the samples 3, 4, and 5 and also containing a trace amount of butyric acid, showed that both the rise and subsequent changes were intermediate between those of samples 1-VFA and 2-VFA.

Figure 6:
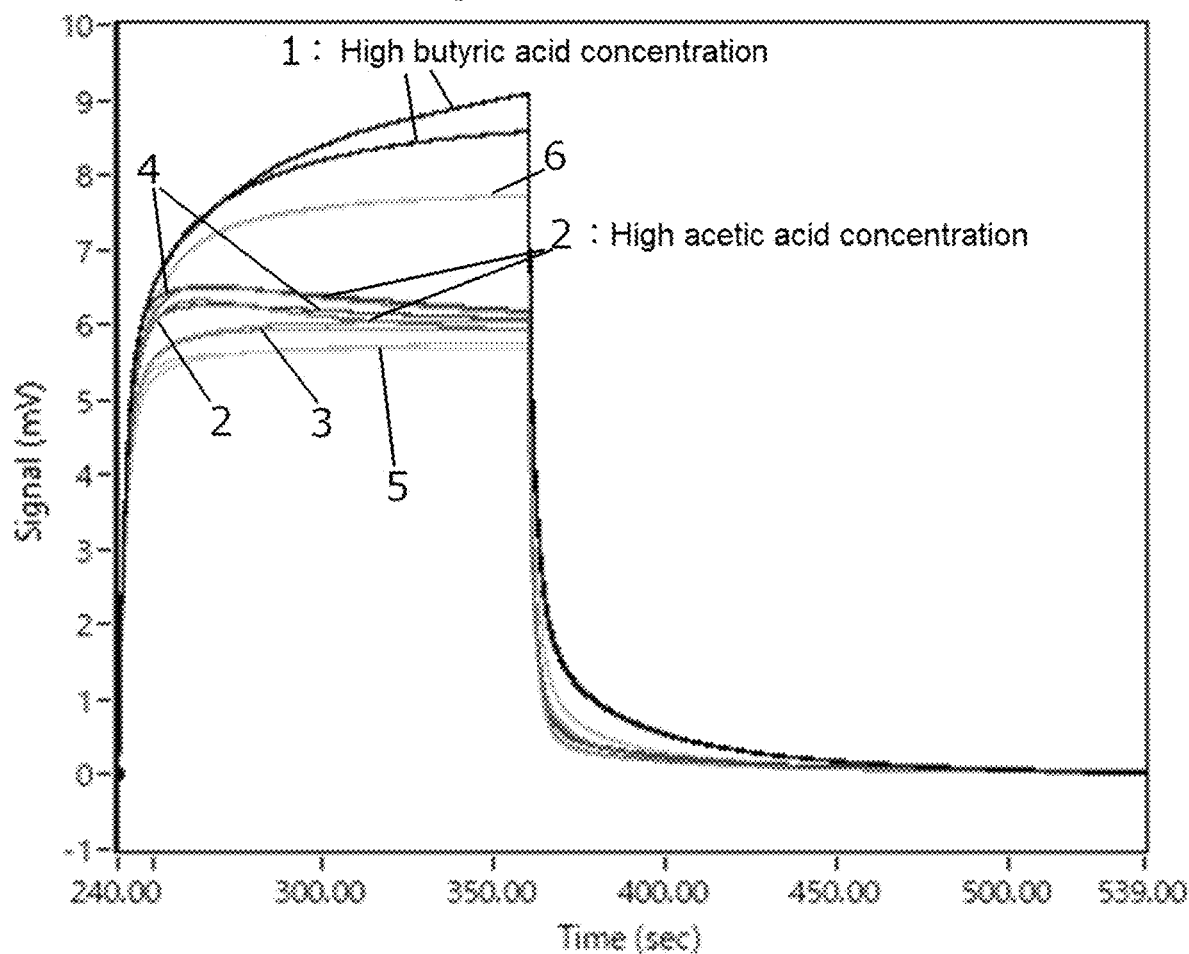
FIG. 6 shows graphs indicating results of measurement performed in the same procedure as in the case of FIG. 5 for the sample gases that were generated from the silages to be measured and individually contained in separate vials.

Further, the silages 1 to 6 were individually contained in separate vials, and the same measurement was performed for the sample gas generated from each silage. The results are shown in FIG. 6. In the measurement shown in FIGS. 4 and 5, aqueous solutions of each organic acid or a plurality of kinds of organic acids were measured, but in the measurement of silages shown in FIG. 6, only the silages were contained in the vials by a predetermined weight, and no liquid such as water or other substance was mixed.

When FIG. 6 showing the signals from the actual silages is compared with FIG. 5 showing the signals from the simulated silages having the same organic acid composition as the actual silages, it is found that although the order relation between the actual silages and the order relation between the simulated silages when compared based on the maximum values for the signals are different, the above-described characteristics of the temporal changes of the signals are almost the same between the actual silages and the simulated silages. Accordingly, the amount and composition of various organic acids in the silage can be measured by the characteristics of the pattern of temporal changes of the signals of the surface stress sensor such as the MSS during the injection period of the gas generated from the silage itself. In particular, it is found that the measurement using ChA is particularly useful for the C4 evaluation described above. In this way, the silage fermentation quality can be evaluated in a simple procedure by evaluating the amount of C4 or higher organic acids such as the butyric acid, and further evaluating the amount of C2 and C3 organic acids such as the acetic acid as necessary. In addition, comparison with Table 2 above shows that, although the measurement of the nitrogen-containing compounds was not performed in Example 1, the evaluation results of the signals and the amounts of butyric acid and acetic acid for various silages described above have a high correlation with the V-score values. Further, as can be seen from the comparison result between FIG. 5 and FIG. 6, the degree of coincidence is high between the result of measuring the gas generated from the organic acid mixed aqueous solution by the surface stress sensor such as the MSS and the result of measuring the gas generated from the silage itself measured in the present invention by the same surface stress sensor, and thus there are advantages that it is easy to perform calibration of the measurement system for the measurement according to the present invention, and it is also easy to perform comparison and collation with the evaluation result by the existing silage evaluation method using the silage extract as the target to be measured. Additionally, the silages evaluated in Example 1 were produced by a general method using dent corn and pasture grass, and were of types widely used as the feed for animals such as cattle. However, the method of the present invention can be advantageously applied to a wide range of silages such as other silages having different raw materials, fermentation methods, or fermented total mixed rations (TMR) obtained by subjecting the silages to secondary processing.

Figure 7:
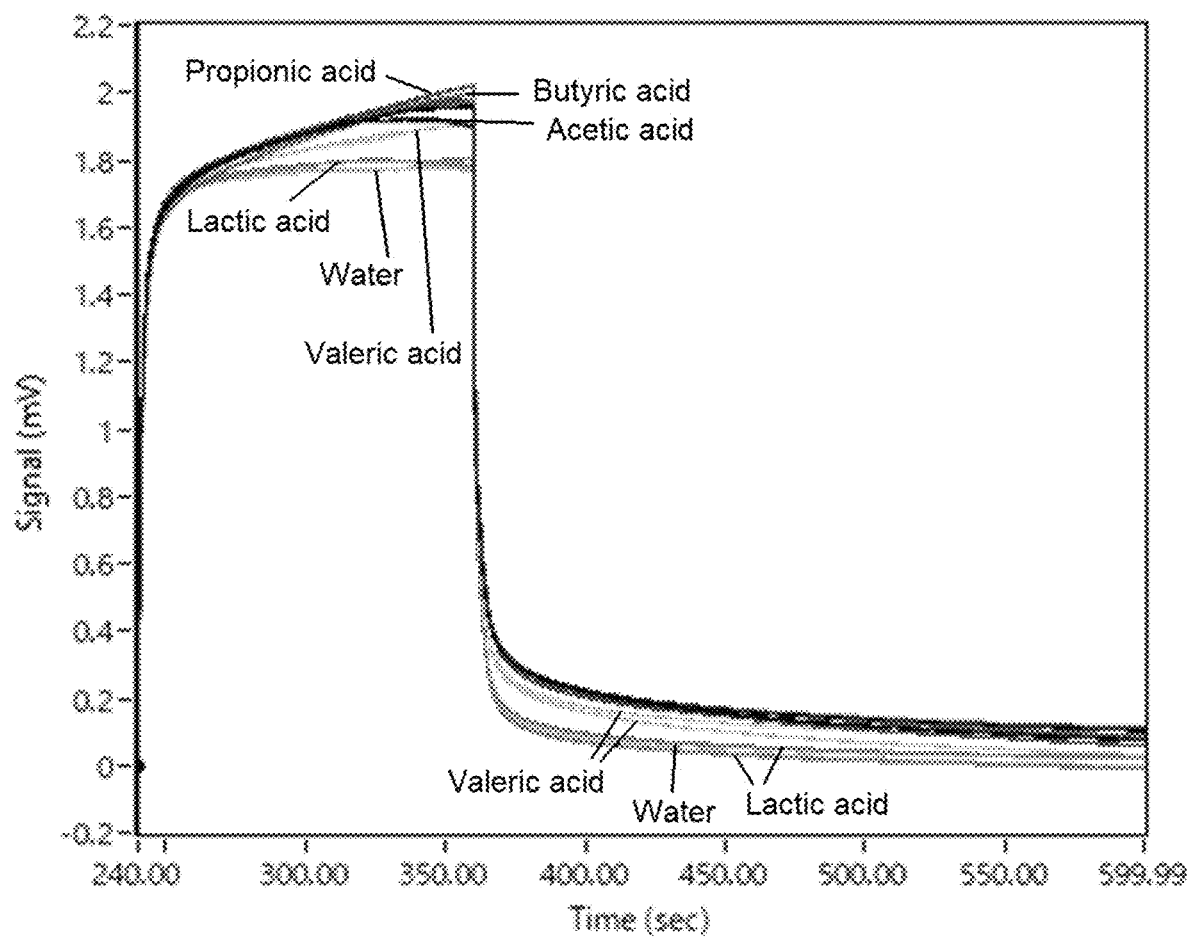
FIG. 7 shows graphs indicating temporal changes (unit: second) of signals (unit: mV) from an MSS of ChB when a 1% aqueous solution of each organic acid, which is identical to that in the measurement of FIG. 4, was contained in a vial and measurement was performed with the measuring device shown in FIG. 1 in the same procedure as in the case of FIG. 4.
Figure 8:
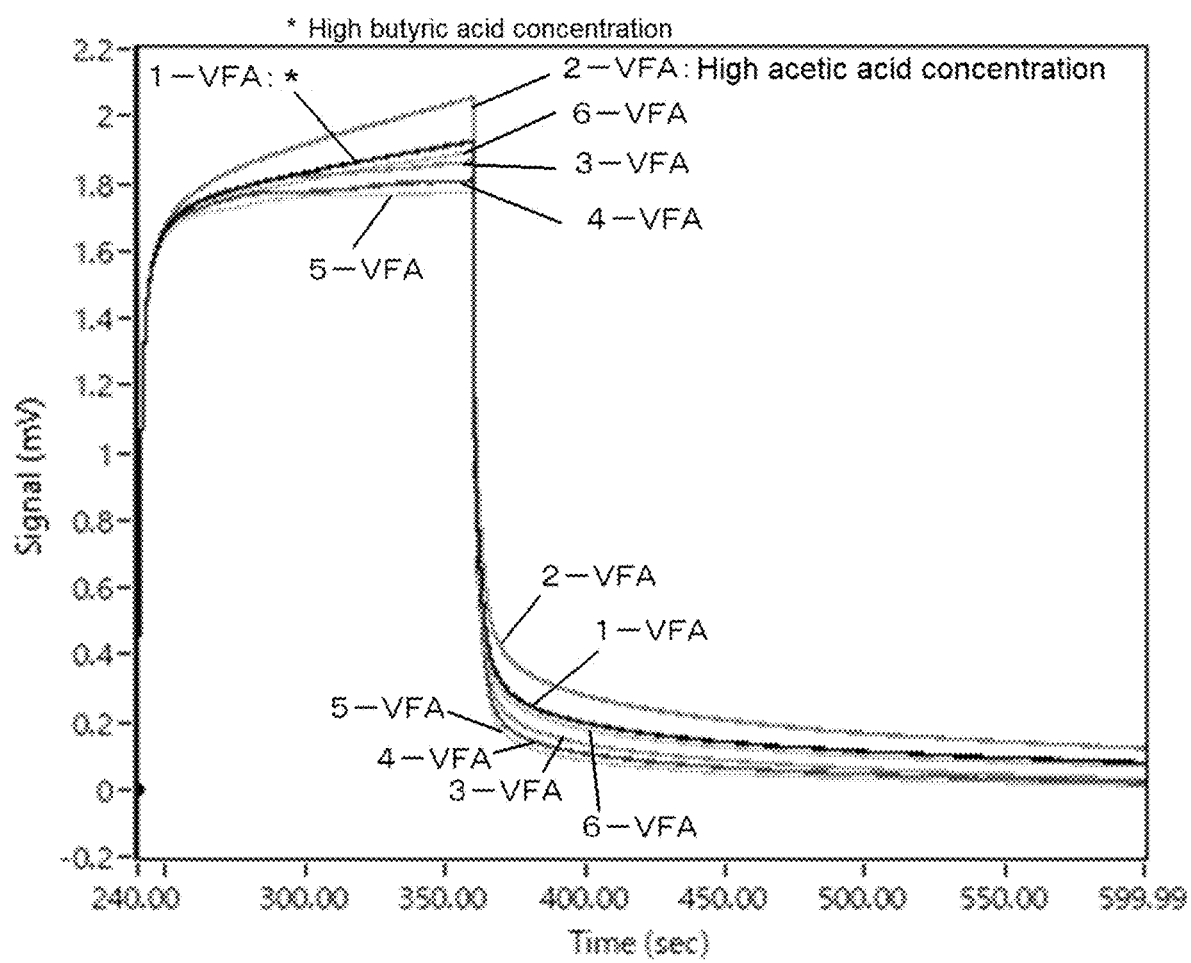
FIG. 8 shows graphs indicating results of measuring mixed organic acid aqueous solutions (simulated silage aqueous solutions) having the same organic acid compositions as extracts of the silages to be measured, which are identical to those in the measurement of FIG. 5, in the same procedure as in the case of FIG. 7.
Figure 9:
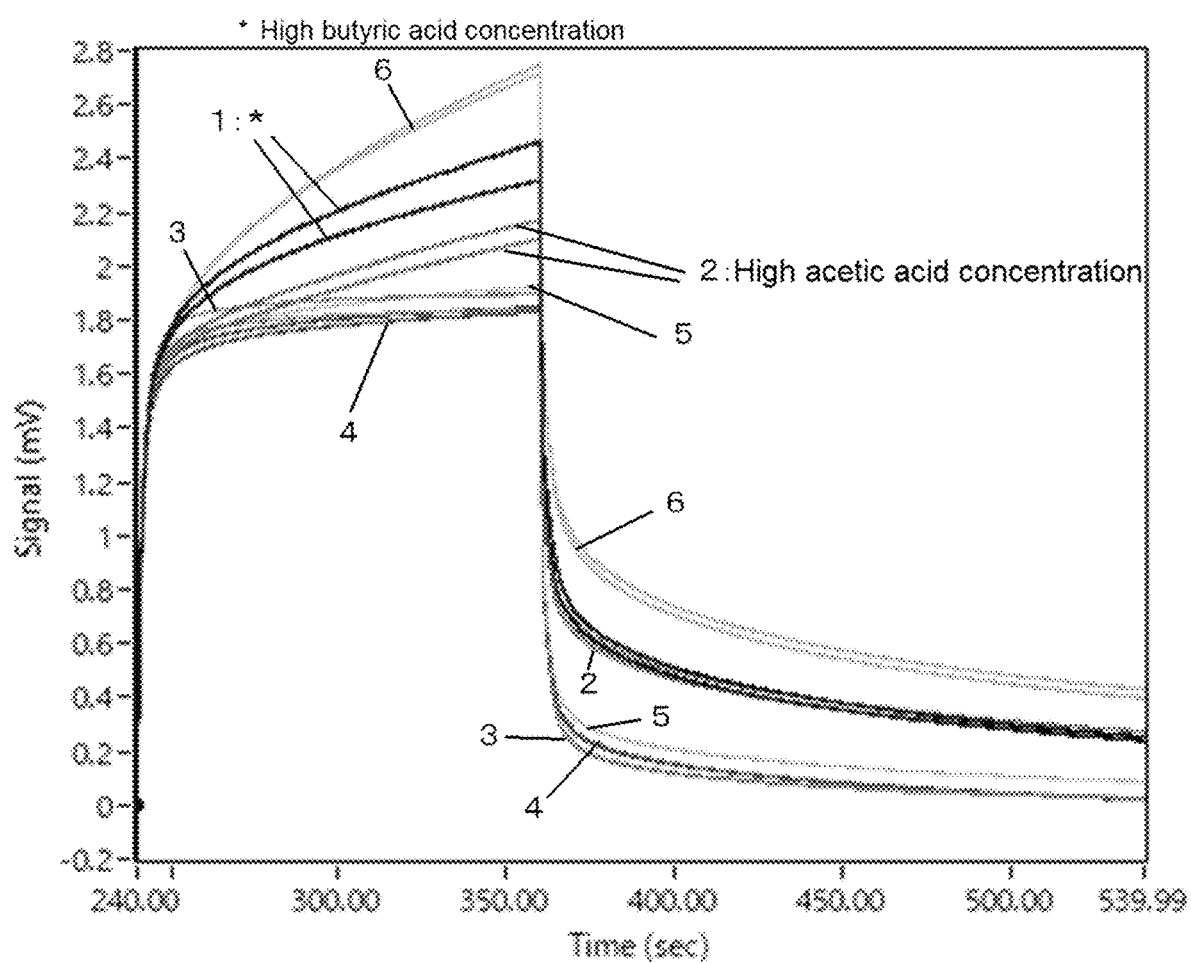
FIG. 9 shows graphs indicating results of measurement performed in the same procedure as in the case of FIG. 8 for the sample gases that were generated from the silages to be measured, which are identical to those in the measurement of FIG. 6, and individually contained in separate vials.
Figure 10:
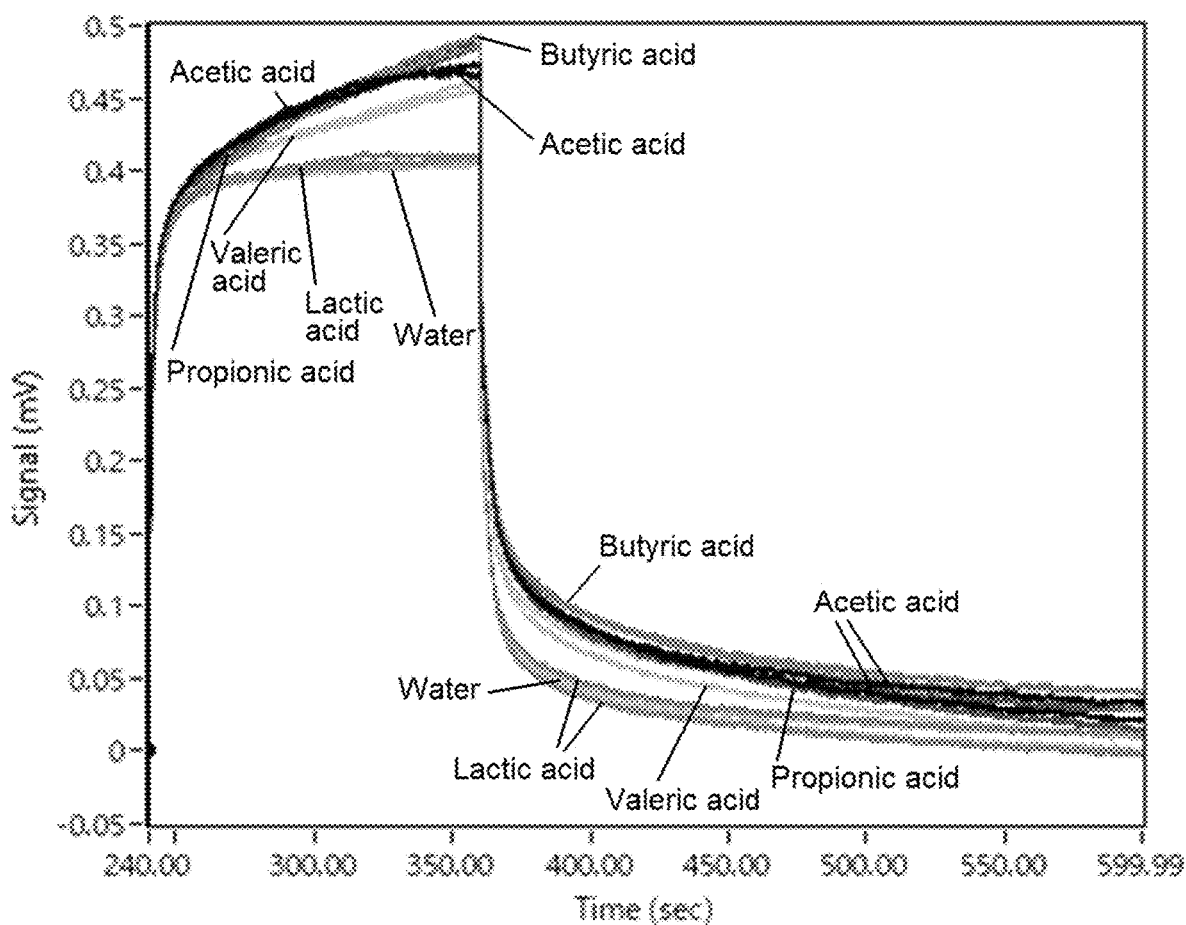
FIG. 10 shows graphs indicating temporal changes (unit: second) of signals (unit: mV) from an MSS of ChC when a 1% aqueous solution of each organic acid, which is identical to that in the measurement of FIG. 4, was contained in a vial and measurement was performed with the measuring device shown in FIG. 1 in the same procedure as in the case of FIG. 4.
Figure 11:
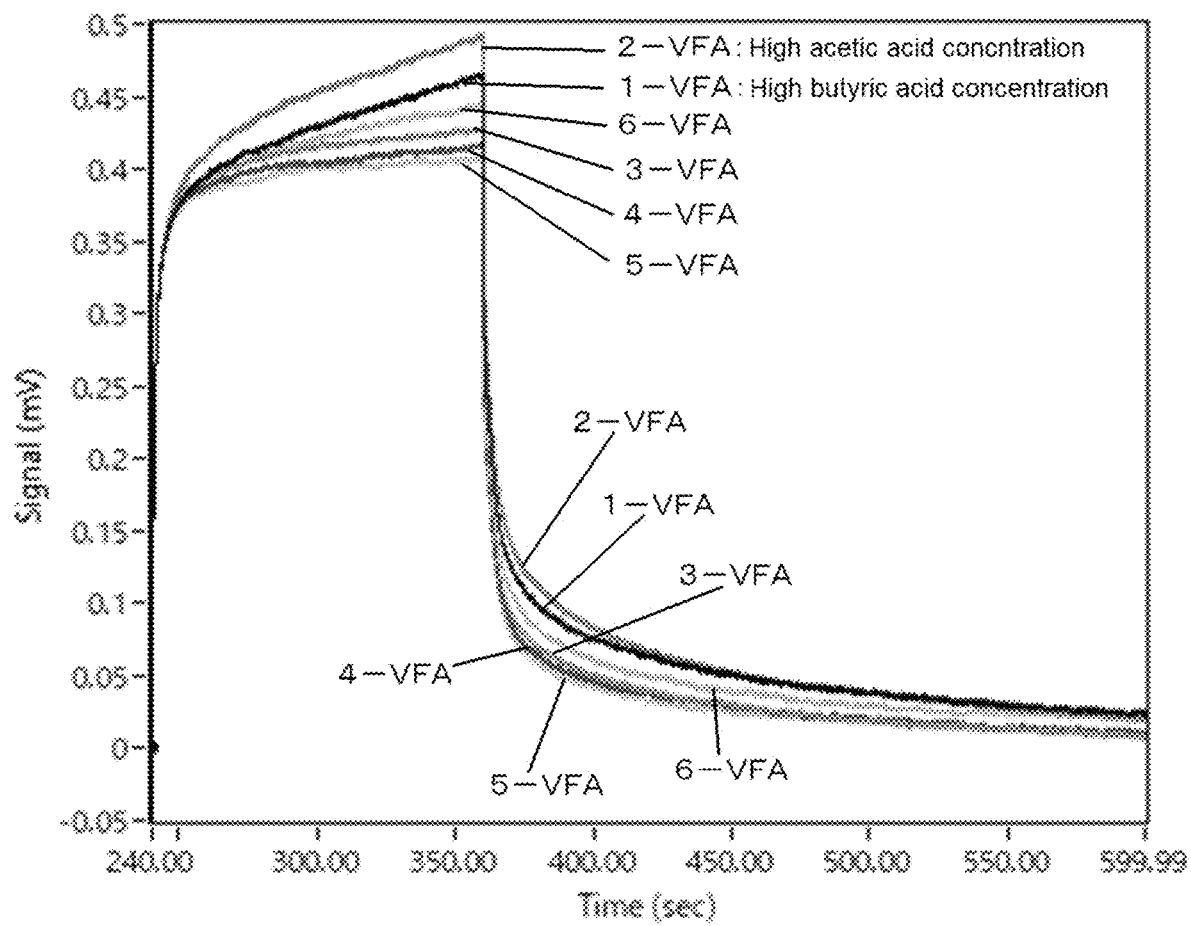
FIG. 11 shows graphs indicating results of measuring mixed organic acid aqueous solutions (simulated silage aqueous solutions) having the same organic acid compositions as extracts of the silages to be measured, which are identical to those in the measurement of FIG. 5, in the same procedure as in the case of FIG. 10.
Figure 12:
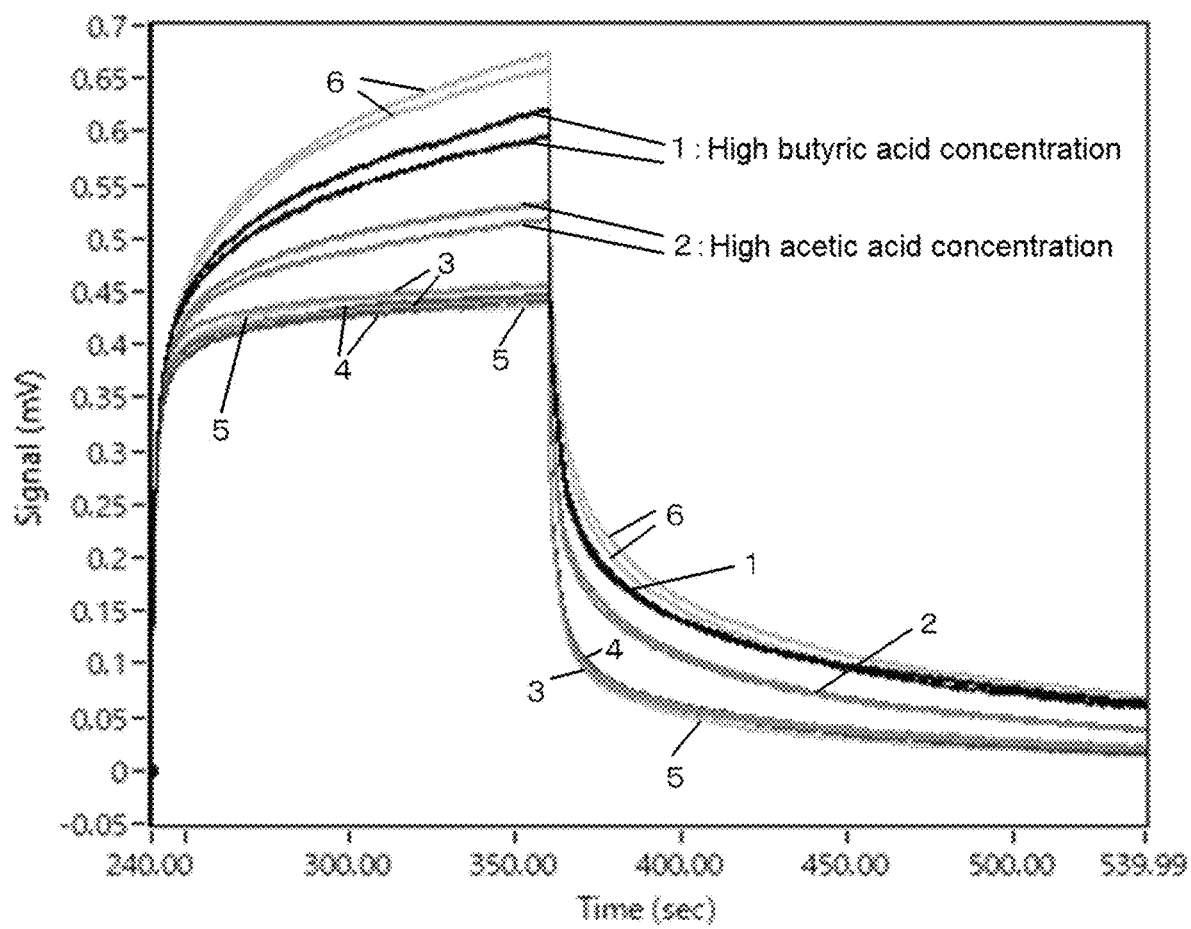
FIG. 12 shows graphs indicating results of measurement performed in the same procedure as in the case of FIG. 11 for the sample gases that were generated from the silages to be measured, which are identical to those in the measurement of FIG. 6, and individually contained in separate vials.

In addition to the measurement using ChA as described above, the MSS of ChB and ChC were used and their signals were measured. The measurement results using ChB are shown in FIGS. 7 to 9, and the measurement results using ChC are shown in FIGS. 10 to 12. In the case of using ChB and ChC, the correlation between the measurement results for individual organic acids as well as the measurement results using the simulated silages and the measurement results for actual silages is lower than that in the case of using ChA. However, the difference in the organic acid compositions generated from the silages are clearly shown in the temporal changes of the signals in FIG. 9 (using ChB) and FIG. 12 (using ChC). As described below, both measurements using ChB and ChC are useful for C2 and C3 evaluation.

FIG. 9 shows the temporal changes of the signals when the actual silages (the sample 1 to the sample 6) were measured using ChB, and for the sample 1 containing a large amount of butyric acid, the sample 2 containing a large amount of acetic acid, and the sample 6 containing a large amount of C2 and C3 (see Table 1 above), the saturation rates of signal rising and signal falling (time until the signal converges to a substantially constant value after switching between the sample gas and the purge gas) are greatly different from each other. Further, while signals for the other silages of the samples 3 to 5 were rapidly saturated after gas switching, the saturation rates for the silages of the samples 1, 2, and 6 were relatively low (the saturation was slow). As can be seen from Table 2 above, the silages of the samples 1, 2, and 6 have distinctly lower C2 and C3 evaluation results than the other silages. Based on this, it can be said that the saturation rates of the rising and falling of the signals of ChB strongly correlate with the C2 and C3 evaluation. Accordingly, the C2 and C3 evaluation of the silage to be measured can be performed by using both or any one of the MSS of ChB and ChC.

Additionally, since the signals from ChB and ChC have relatively similar temporal change patterns of the signals due to VFA that can be contained in a large amount in the silage, as can be seen from FIGS. 9 and 12, rather than the patterns of temporal changes of the signals being different from each other, the temporal changes are often substantially similar in the intensity direction of the signals (after multiplying the temporal change in the signal intensity from one sample by a constant and then translating in the intensity direction approximately, this temporal change overlaps with the temporal change in the signal intensity from another sample). Accordingly, when the sample gas supply is stabilized by making the amount of the sample to be used for measurement as constant as possible, and other signal normalization and standardization are performed, the silage evaluation system can be further improved.

Example 2

In Example 2, a measurement system that has a schematic configuration shown in FIG. 1 and is contained in an incubator was used, and as the samples to be measured, three kinds of silages different from those used in Example 1 were contained in vials, and measurement was performed. Each silage was measured by containing a predetermined weight of silage in the vial as it was without particularly adding water or the like. Temperature of the incubator was 30° C., and flow rates of sample gas and purge gas were 10 sccm. Additionally, sampling time was 120 seconds, and ratio of the sampling time to the purge time was 1:2.

Further, in the actual measurement, some changes in the temperature and the relative humidity in the incubator are inevitable, but in Example 2, the changes in the temperature and the relative humidity in the incubator (in the module of the measurement system) at the time of measurement were suppressed to a range that is considered to have no significant influence on the measurement result.

Further, in Example 2, before obtaining the measurement data, as a preliminary operation, the sample gas and the purge gas to be measured were caused to flow in the measurement system at the same flow rate as the actual measurement and with the switching cycle of both gases set to be identical to the actual measurement. By performing this preliminary operation, the measurement data can be further stabilized (that is, the accuracy of the measurement data is further improved). Such a preliminary operation is often performed in a measurement using an arbitrary gas as the sample to be measured, and number of cycles (time) is not particularly limited, but 200 cycles (20 hours in total) were set in Example 2. The measurement data described in Example 1 was also acquired after the same preliminary operation was performed.

The silages measured in Example 2 are a "high quality silage sample", a "low quality silage sample", and a "high quality silage sample with reduced volatile components". The "high quality silage sample" and the "low quality silage sample" are respectively a silage sample evaluated to have high quality and a silage sample evaluated to have low quality, as a result of evaluating superiority and inferiority of the silage sample quality based on results of chemical analysis including organic acid contents shown in the following table. The "high quality silage sample with reduced volatile components" is a silage sample in which the volatile components are reduced by containing a certain amount of the "high quality silage sample" in the vial and exposing it to a purge gas for a certain period of time. Hereinafter, the "high quality silage sample", the "low quality silage sample", and the "high quality silage sample with reduced volatile components" are also referred to as sample 7, sample 8, and sample 9, respectively. The table below shows the measurement results of the organic acids contained in the samples 7 to 9.

ChN: tetraethoxysilane-modified silica/titania composite nanoparticles (hereinafter, also referred to as "TEOS-STNPs")

Figure 13:
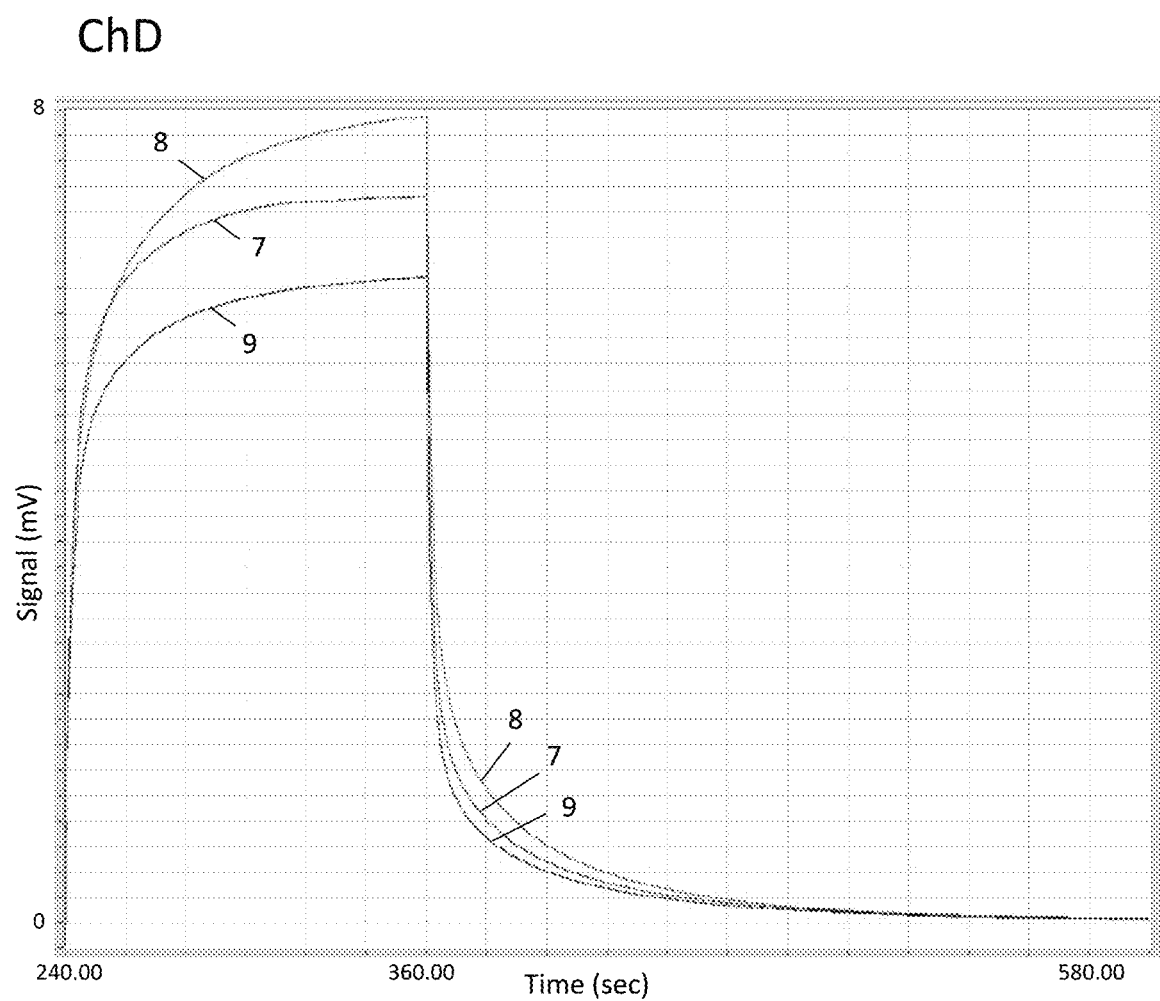
FIG. 13 shows graphs indicating temporal changes (unit: second) of signals (unit: mV) from an MSS of ChD when three kinds of silage samples to be measured were individually contained in separate vials and sample gases generated therefrom were measured with the measuring device shown in FIG. 1 in Example 2.
Figure 14:
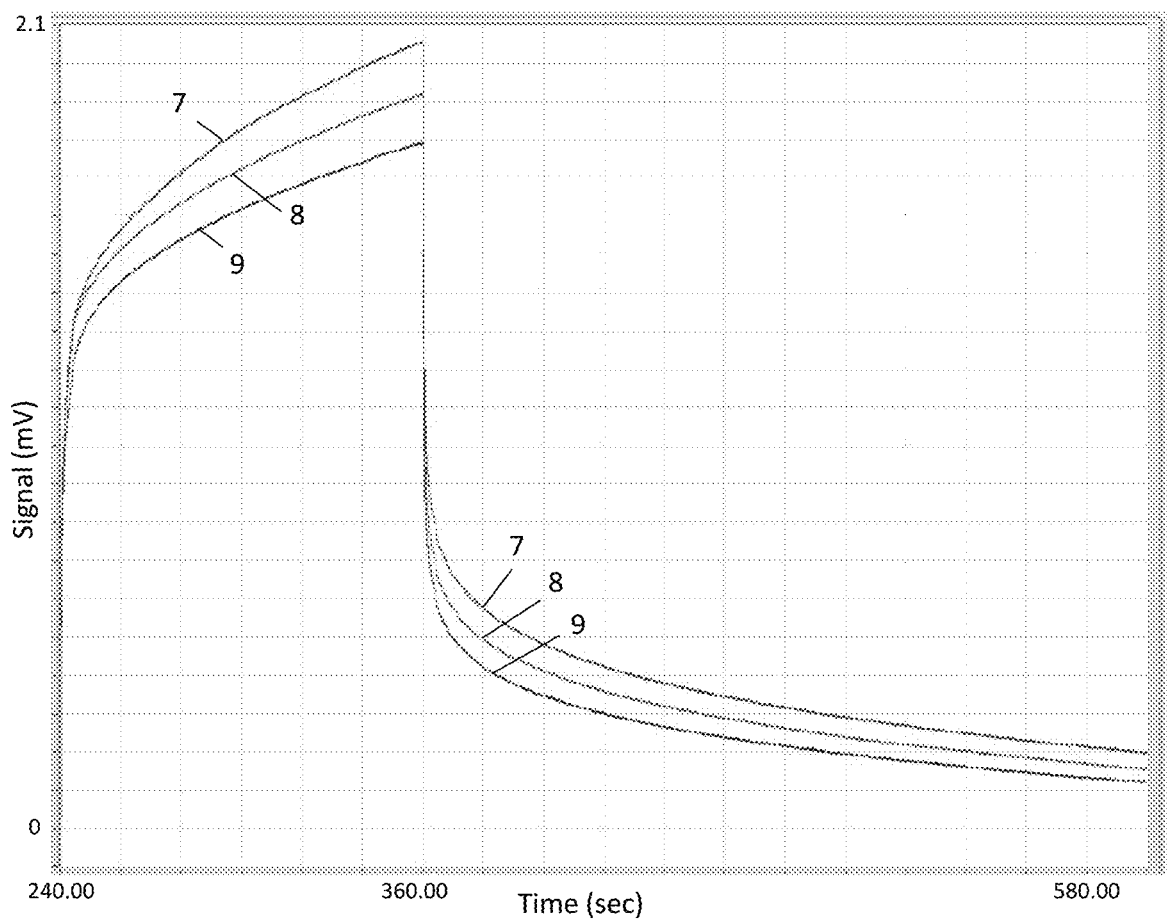
FIG. 14 shows graphs indicating temporal changes (unit: second) of signals (unit: mV) from an MSS of ChE when measurement was performed in the same procedure as in the case of FIG. 13 for three kinds of silage samples to be measured, which are identical to those in the measurement in FIG. 13.

FIG. 13 shows temporal changes (unit: second) of signals (unit: mV) from the MSS of ChD when three kinds of silage samples to be measured were individually contained in separate vials and the sample gas generated therefrom was measured with the measuring device shown in FIG. 1. In the measurement sequence, first, the purge gas was caused to flow for 240 seconds, then the sample gas was caused to flow for 120 seconds, and then the purge gas was caused to flow again for 240 seconds. In the actual measurement, each sample was measured a plurality of times, and FIG. 13 shows representative data among the measurement results.

As can be seen from FIG. 13, in the measurement using ChD (sensitive film material: polymethyl methacrylate), the signal change (signal waveform) during the sample gas injection period (120 seconds) is clearly different among the three kinds of silage samples. More specifically, in the measurement using ChD, in addition to the fact that the difference between the sample 7 and the sample 8 of which the superiority and inferiority in terms of quality were identified by the chemical analysis could be identified, it has been confirmed that the difference in the contents of volatile components in the silage samples (the sample 7 and the sample 9) evaluated to have the same quality (high quality) by the chemical analysis could also be identified. As a result of separate measurement with a proton transfer reaction time-of-flight mass spectrometer, the concentrations of the acetic acid and the butyric acid, which are representative volatile components, were 57 ppm for the acetic acid and 21 ppm for the butyric acid in the sample 7, 32 ppm for the acetic acid and 23 ppm for the butyric acid in the sample 8,

TABLE 3

| | | Organic acids % (w/v) | | | | | | | | |
|---|---|---|---|---|---|---|---|---|---|---|
| Sample No. | pH | Malic acid | Succinic acid | Lactic acid | Acetic acid | Propionic acid | Isobutyric acid | Ractic acid | Isovaleic acid | Valeic acid |
| 7 | 3.81 | 0.21 | 0.06 | 2.32 | 0.66 | 0.04 | nd | 0.18 | nd | 0.03 |
| 8 | 4.36 | 0.19 | 0.02 | 1.23 | 0.51 | 0.05 | 0.02 | 0.54 | nd | nd |
| 9 | — | — | — | — | — | — | — | — | — | — |

The MSS used was actually an aggregate including a plurality of MSS each coated with a different sensitive film material. In the following, description will be made mainly based on signals output from ChD as an example, but signals output from the other MSS will also be described with appropriate reference. The number of each MSS and the applied sensitive film material are as follows.

ChD: polymethyl methacrylate
ChE: poly(4-methylstyrene)
ChF: phenyl group-modified silica/titania composite nanoparticles (hereinafter, also referred to as "phenyl-STNPs")
ChG: octadecyl group-modified silica/titania composite nanoparticles (hereinafter, also referred to as "C18-STNPs")
ChH: poly(2,6-diphenyl-p-phenylene oxide) (Tenax TA (Mesh: 60/80))
ChI: polyvinyl fluoride
ChJ: polystyrene
ChK: polycaprolactone
ChL: cellulose acetate butyrate
ChM: polyethyleneimine and 16 ppm for the acetic acid and 6 ppm for the butyric acid in the sample 9, and it is considered that the signals of the MSS reflected the difference in these concentrations. Additionally, in the measurement using ChD, the saturation rates of the signal falling in the purge period after the sample gas injection period are also significantly different among the sample 7, the sample 8, and the sample 9.

FIGS. 14 to 23 show temporal changes (unit: second) of signals (unit: mV) from the MSS of ChE to ChN when measurement was performed in the same procedure as in the case of FIG. 13 for three kinds of silage samples to be measured, which are identical to those in the measurement in FIG. 13.

The characteristics of the signal changes (the temporal changes) obtained from each MSS are different due to the difference in the sensitive film materials used. From FIGS. 14 to 23, it can be seen that in the measurement using ChE to ChN, the signal change (the signal waveform) in the sample gas injection period (120 seconds) is different among the three kinds of silage samples. In particular, in the measurement using ChE (sensitive film material: poly(4-methylstyrene), the same material as ChC of Example 1), ChH (sensitive film material: poly(2,6-diphenyl-p-phenylene oxide), the same material as ChB of Example 1), ChI (sensitive film material: polyvinyl fluoride), ChJ (sensitive film material: polystyrene), ChL (sensitive film material: cellulose acetate butyrate), and ChM (sensitive film material: polyethyleneimine), as in the measurement using ChD shown in FIG. 13, the signal change (the signal waveform) during the sample gas injection period (120 seconds) is clearly different among the three kinds of silage samples (FIGS. 14, 17, 18, 19, 21, and 22). On the other hand, in these MSS, the saturation rates of signal falling in the purge period after the sample gas injection period tended to be different. For example, in the measurement using ChE and ChI, difference in the saturation rates of the signal falling was observed among the sample 7, the sample 8, and the sample 9 as in the case of ChD, but in the measurement using ChH, ChJ, ChL, and ChM, the saturation rates of the signal falling in the sample 7 and the sample 8 were almost the same or slightly different, whereas the saturation rate of the signal falling in the sample 9 tended to be quicker than those of the sample 7 and the sample 8.

Figure 15:
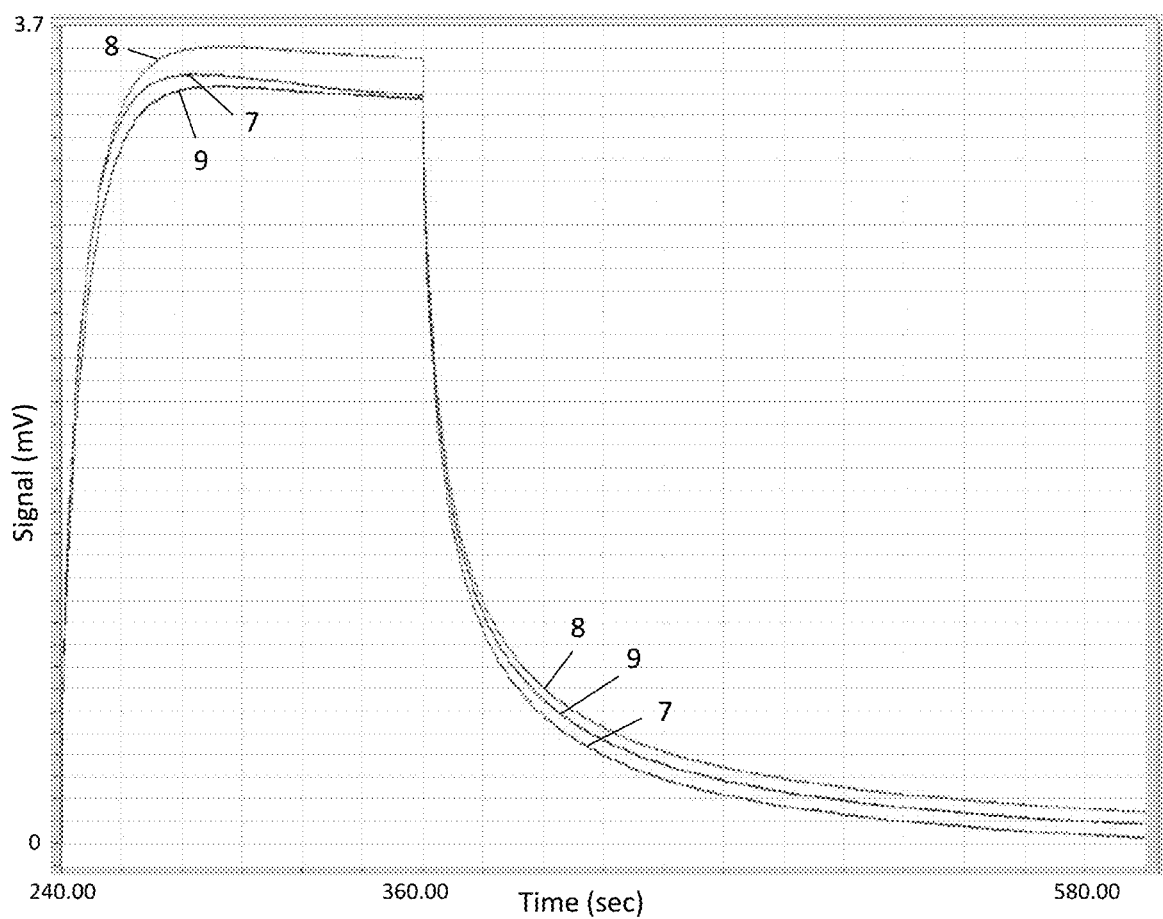
FIG. 15 shows graphs indicating temporal changes (unit: second) of signals (unit: mV) from an MSS of ChF when measurement was performed in the same procedure as in the case of FIG. 13 for three kinds of silage samples to be measured, which are identical to those in the measurement in FIG. 13.

In the measurement using ChF (sensitive film material: phenyl-STNPs), significantly different signal changes were observed among the sample 7, the sample 8, and the sample 9 in both the sample gas injection period and the purge period after the sample gas injection period (FIG. 15).

Figure 16:
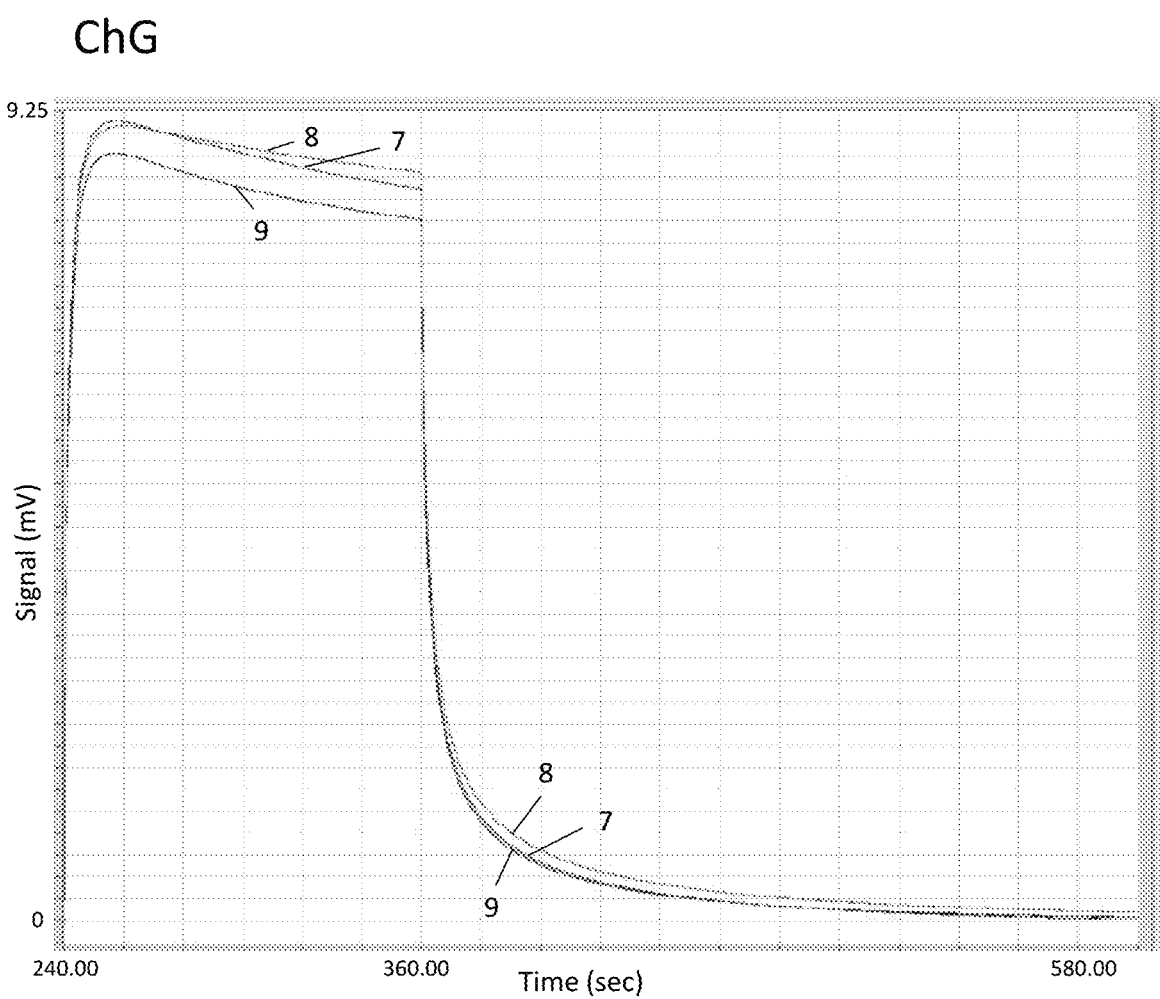
FIG. 16 shows graphs indicating temporal changes (unit: second) of signals (unit: mV) from an MSS of ChG when measurement was performed in the same procedure as in the case of FIG. 13 for three kinds of silage samples to be measured, which are identical to those in the measurement in FIG. 13.
Figure 17:
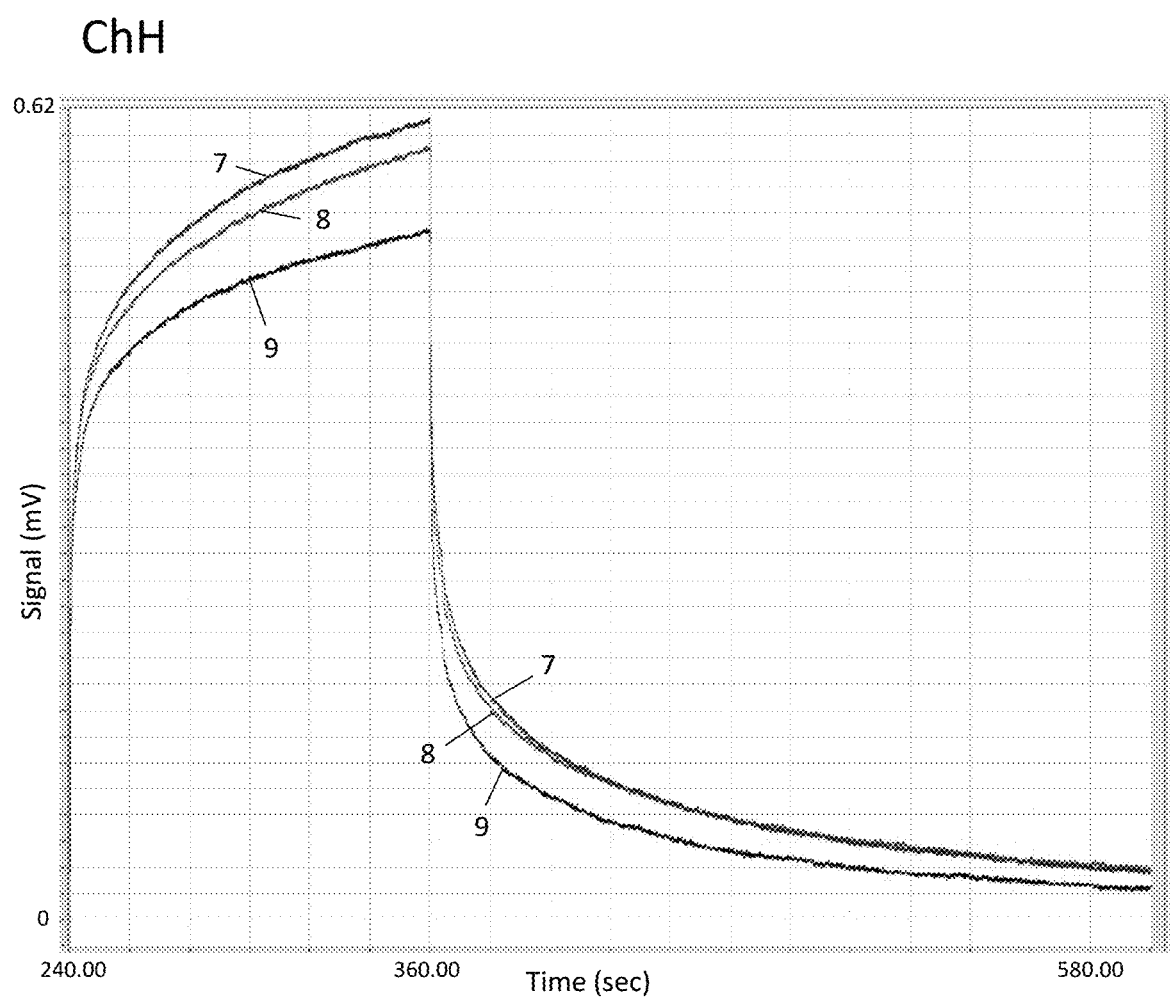
FIG. 17 shows graphs indicating temporal changes (unit: second) of signals (unit: mV) from an MSS of ChH when measurement was performed in the same procedure as in the case of FIG. 13 for three kinds of silage samples to be measured, which are identical to those in the measurement in FIG. 13.
Figure 18:
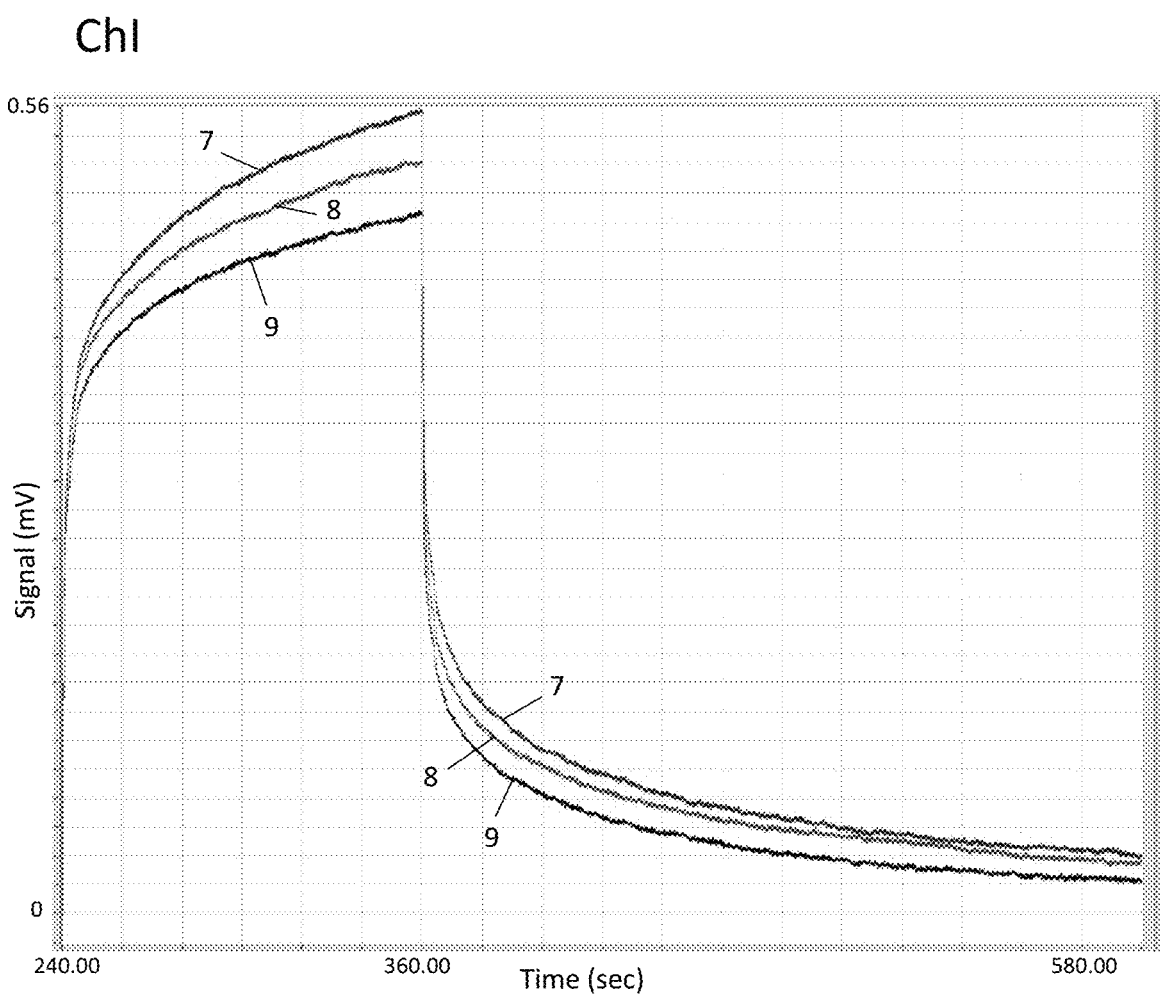
FIG. 18 shows graphs indicating temporal changes (unit: second) of signals (unit: mV) from an MSS of ChI when measurement was performed in the same procedure as in the case of FIG. 13 for three kinds of silage samples to be measured, which are identical to those in the measurement in FIG. 13.
Figure 19:
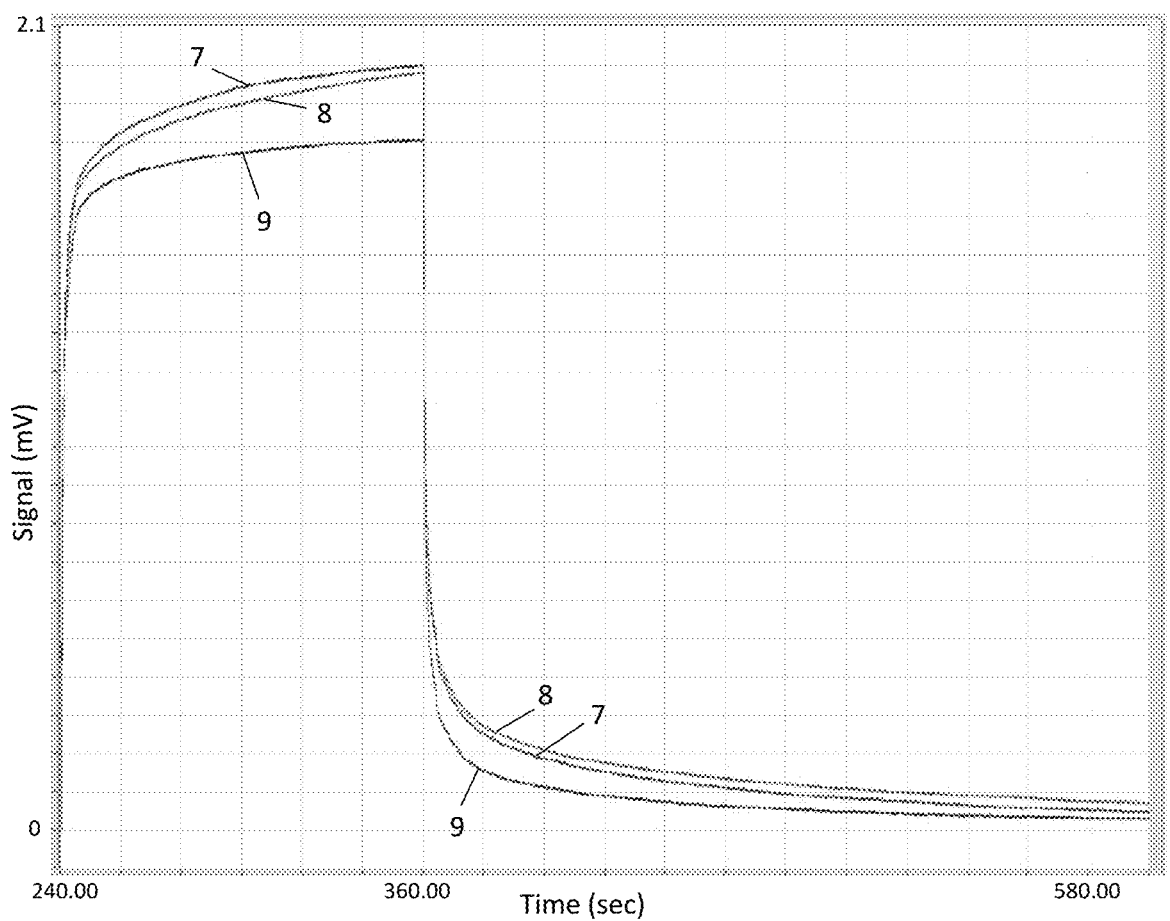
FIG. 19 shows graphs indicating temporal changes (unit: second) of signals (unit: mV) from an MSS of ChJ when measurement was performed in the same procedure as in the case of FIG. 13 for three kinds of silage samples to be measured, which are identical to those in the measurement in FIG. 13.

In the measurement using ChG (sensitive film material: C18-STNPs), the difference in signal change between the samples 7 and 8 and the sample 9 tended to be larger than the difference in signal change between the sample 7 and the sample 8 during the sample gas injection period. In addition, in the purge period after the sample gas injection period, there was a difference in the saturation rate of the signal falling between the sample 8 and the samples 7 and 9, and it was suggested that the difference can be identified between the samples of which the superiority and inferiority in terms of quality were identified by the chemical analysis (FIG. 16).

Figure 20:
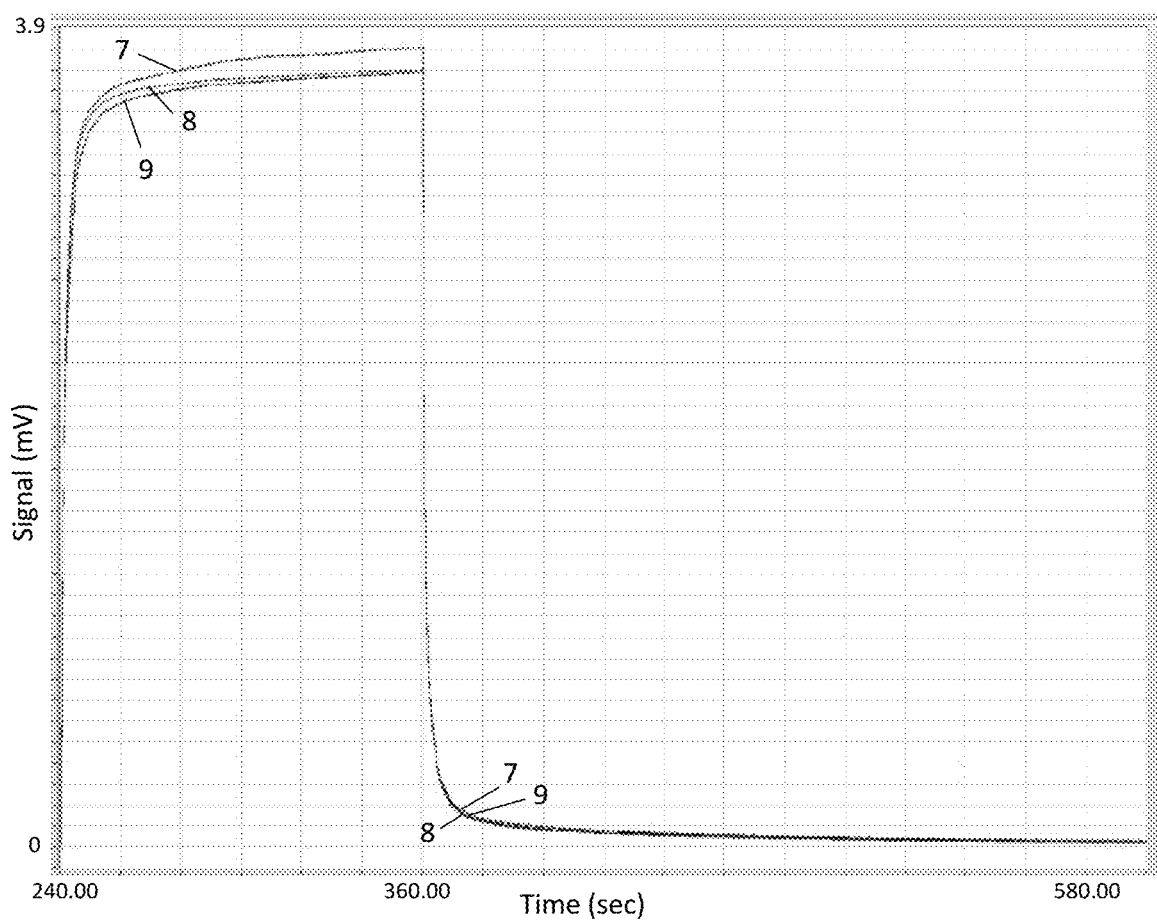
FIG. 20 shows graphs indicating temporal changes (unit: second) of signals (unit: mV) from an MSS of ChK when measurement was performed in the same procedure as in the case of FIG. 13 for three kinds of silage samples to be measured, which are identical to those in the measurement in FIG. 13.
Figure 21:
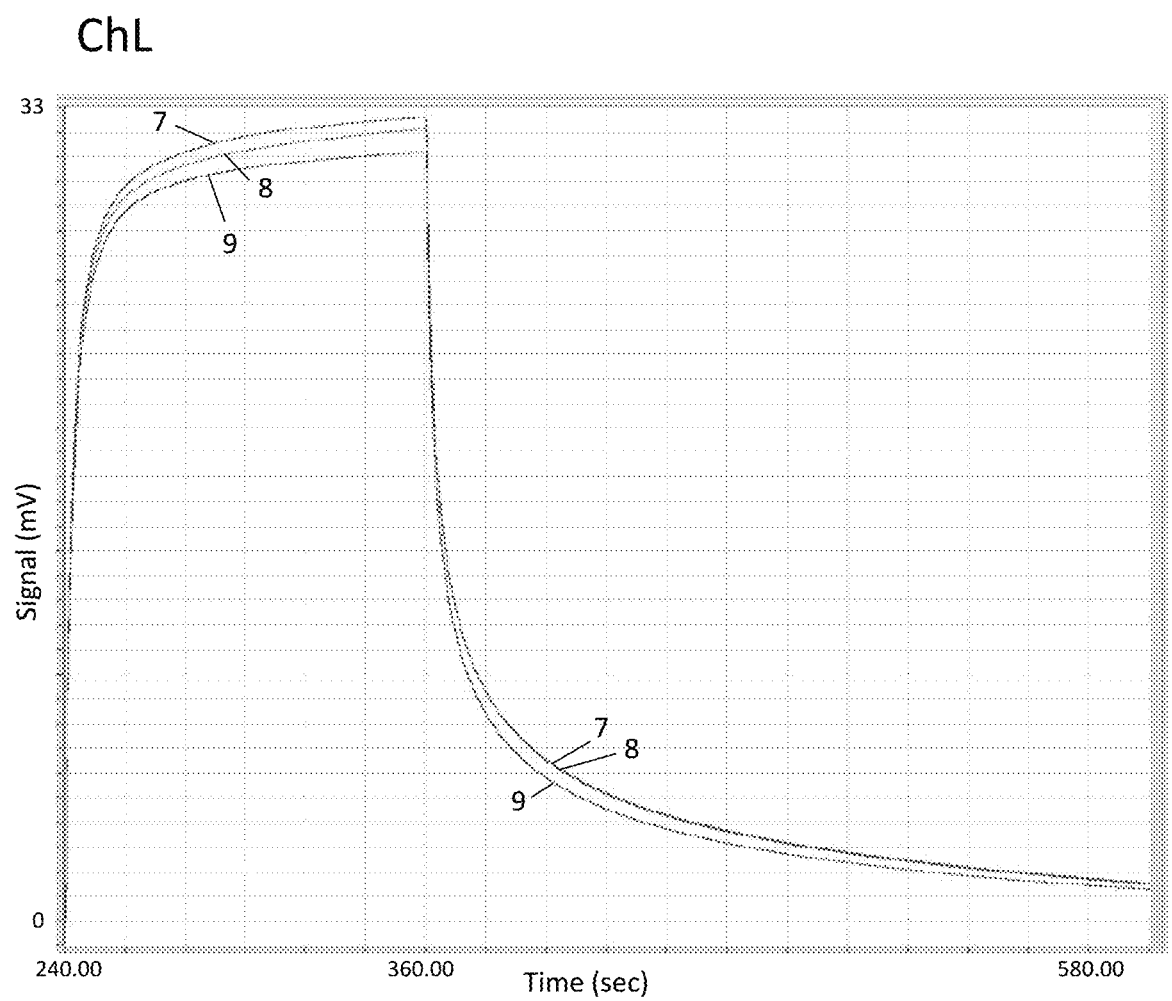
FIG. 21 shows graphs indicating temporal changes (unit: second) of signals (unit: mV) from an MSS of ChL when measurement was performed in the same procedure as in the case of FIG. 13 for three kinds of silage samples to be measured, which are identical to those in the measurement in FIG. 13.
Figure 22:
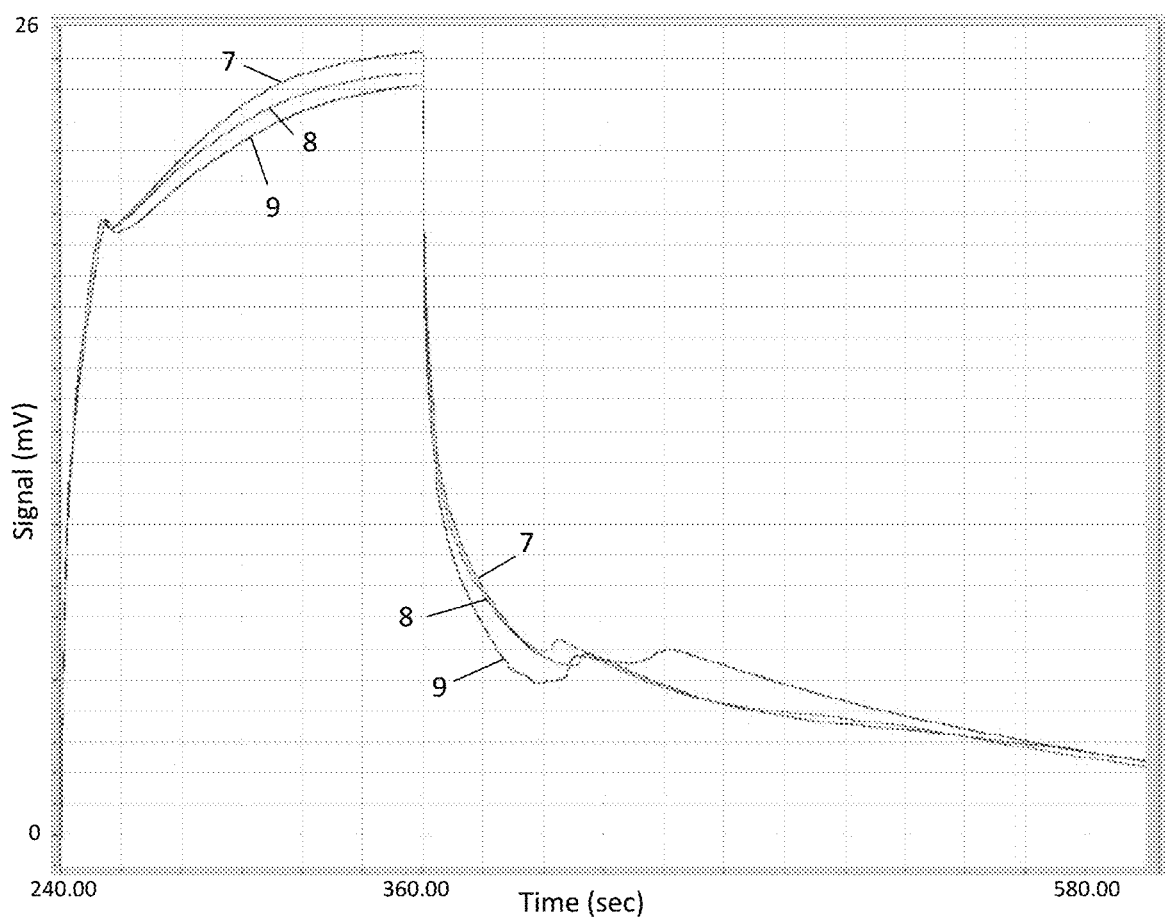
FIG. 22 shows graphs indicating temporal changes (unit: second) of signals (unit: mV) from an MSS of ChM when measurement was performed in the same procedure as in the case of FIG. 13 for three kinds of silage samples to be measured, which are identical to those in the measurement in FIG. 13.

In the measurement using ChK (sensitive film material: polycaprolactone), there was a difference in signal change among the sample 7, the sample 8, and the sample 9 during the sample gas injection period although it was not a significant difference as compared with other MSS used in the measurement of Example 2. On the other hand, in the purge period after the sample gas injection period, there was almost no difference in the saturation rate of signal falling among the sample 7, the sample 8, and the sample 9 (FIG. 20).

In the measurement using ChN (sensitive film material: TEOS-STNPs), as in the case of ChK, there was a difference in signal change among the sample 7, the sample 8, and the sample 9 during the sample gas injection period although it was not a significant difference in comparison with other MSS used in the measurement of Example 2. In addition, during the purge period after the sample gas injection period, as in the case of ChG, there was a difference in the saturation rate of signal falling between the sample 8 and the samples 7 and 9, and it was suggested that the difference can be identified between the samples for which the superiority and inferiority in terms of quality were identified by the chemical analysis (FIG. 23).

In addition, the silages evaluated in Example 2 were produced by a general method using dent corn and pasture grass, similarly to the silages used in Example 1, and were of types widely used as the feed for animals such as cattle. Therefore, also from the results of Example 2, it is found that the method of the present invention can be advantageously applied to a wide range of silages such as other silages having different raw materials, fermentation methods, or fermented TMR obtained by subjecting the silages to secondary processing.

In the present invention, when evaluating signals given from the measurement system, it is only necessary to visually observe the temporal change of the signals when a rough evaluation is sufficient, but for more accurate evaluation, for example, temporal change patterns of signals corresponding to various types of silage quality may be prepared as reference patterns, so that a general pattern matching in the measurement technology field may be performed to collate the pattern of temporal changes obtained from the silage to be measured with the reference patterns. Alternatively, the silage quality can also be evaluated from the pattern of temporal changes of signals obtained from the silage by using a machine learning method that has been often used in the measurement technology field in recent years. Such pattern matching, machine learning, etc., can be executed by an arbitrary information processing device such as an information processing device provided in the measurement system or an information processing device connected to the measurement system via an interface or a communication line. The principle of pattern matching and machine learning and the method of applying these to various measurement results are well-known matters, and thus further description are omitted.

INDUSTRIAL APPLICABILITY

As described above, according to the present invention, the silage fermentation quality can be evaluated in a short time in a simple procedure using a simple device configuration compared to the conventional art, and thus the evaluation of silage fermentation quality can be easily performed at the site of production, distribution, and use of the silage.

CITATION LIST

Patent Literature

Patent Literature 1: JP 2019-128312 A
Patent Literature 2: JP 2018-132325 A
Patent Literature 3: WO 2011/148774 A Non Patent Literature Non Patent Literature 1: Subsistence Feed Quality Assessment Study Group, ed., "Quality Assessment Guidebook for Crude Feed (Revised)", Japan Grassland Agriculture and Forage Seed Association (2001)
Non Patent Literature 2: Minami-Nemuro District Farming Improvement Council, "THE SILAGE", special edition, 7. How do I check the fermentation quality of silage?, The Nemuro Center for Improving and Popularizing Agriculture, Documents for Farming Improvement Vol. 26, 1997 (http://www.nemuro.pref.hokkaido.Ig.jp/ss/nkc/kannkoubutsu/no26/26-02-3.pdf)

The invention claimed is:

1. An evaluation method for silage fermentation quality, the method comprises:
   providing a gas generated from silage to a surface stress sensor, and
   performing an evaluation of fermentation quality based on a composition of the gas generated from the silage using signals output from the surface stress sensor in response to the gas generated from the silage, wherein in the surface stress sensor, a response characteristic to at least one of organic acids belonging to C2 and C3 and a response characteristic to at least one of organic acids belonging to C4 are different, wherein the C2 and C3 refer to organic acids having 2 or 3 carbon atoms, respectively, and the C4 refers to organic acids having 4 or more carbon atoms, and the evaluation of fermentation quality based on the composition of the gas generated from the silage is performed from the result of at least either one of:
criterion 1: the value of the ratio of the amount of the C4 to the amount of the C2 and C3; and
criterion 2: the amount of the C2 and C3.

2. The evaluation method for silage fermentation quality according to claim 1, wherein the evaluation of fermentation quality based on the composition of the gas generated from the silage is further performed based on the amount of nitrogen-containing compounds in the gas.

3. The evaluation method for silage fermentation quality according to claim 1, wherein the evaluation of fermentation quality is performed based on a pattern of temporal changes of the signals.

4. The evaluation method for silage fermentation quality according to claim 3, wherein the evaluation of fermentation quality is performed based on evaluation of influence of amount of butyric acid in the gas generated from the silage on the pattern of temporal changes of the signals.

5. The evaluation method for silage fermentation quality according to claim 3, wherein the evaluation of fermentation quality is performed based on evaluation of influence of amount of acetic acid in the gas generated from the silage on the pattern of temporal changes of the signals.

6. The evaluation method for silage fermentation quality according to claim 1, wherein, as the gas generated from the silage, a gas obtained by passing a gas substantially not containing a component that affects the evaluation of fermentation quality through a container containing silage to be evaluated is supplied to the surface stress sensor.

7. The evaluation method for silage fermentation quality according to claim 1, wherein the evaluation of fermentation quality is performed using the signals after a supply of the gas generated from the silage to the surface stress sensor is started.

8. The evaluation method for silage fermentation quality according to claim 1, wherein the surface stress sensor is a membrane-type surface stress sensor.

9. The evaluation method for silage fermentation quality according to claim 1, wherein at least one selected from a group consisting of poly(methyl vinyl ether-alt-maleic anhydride), poly(2,6-diphenyl-p-phenylene oxide), and poly(4-methylstyrene) is used as a material of a sensitive film of the surface stress sensor.

10. The evaluation method for silage fermentation quality according to claim 9, wherein, as the surface stress sensor, at least a first surface stress sensor using one material selected from the group as the sensitive film and a second surface stress sensor using another material selected from the group as the sensitive film are used.

11. The evaluation method for silage fermentation quality according to claim 1, wherein at least one selected from a group consisting of polymethyl methacrylate, poly(4-methylstyrene), phenyl group-modified silica/titania composite nanoparticles, octadecyl group-modified silica/titania composite nanoparticles, poly(2,6-diphenyl-p-phenylene oxide), polyvinyl fluoride, polystyrene, polycaprolactone, cellulose acetate butyrate, polyethyleneimine, and tetraethoxysilane-modified silica/titania composite nanoparticles is used as a material of a sensitive film of the surface stress sensor.

12. The evaluation method for silage fermentation quality according to claim 11, wherein, as the surface stress sensor, at least a first surface stress sensor using one material selected from the group as the sensitive film and a second surface stress sensor using another material selected from the group as the sensitive film are used.

13. The evaluation method for silage fermentation quality according to claim 1, wherein the gas generated from the silage and a purge gas are alternately supplied to the surface stress sensor, and the evaluation of silage fermentation quality is performed using the signals corresponding to the gas generated from the silage and the signals corresponding to the purge gas.

14. The evaluation method for silage fermentation quality according to claim 13, wherein a time frame during which a predetermined reference gas is given to the surface stress sensor is provided in addition to a time frame during which the gas generated from the silage is supplied to the surface stress sensor and a time frame during which the purge gas is given to the surface stress sensor, and the signals corresponding to the reference gas are further used in the evaluation of silage fermentation quality.

15. The evaluation method for silage fermentation quality according to claim 14, wherein the reference gas is a gas generated from a liquid or a solid.

16. An evaluation device for silage fermentation quality comprising:
at least one surface stress sensor;
a first gas flow path for supplying a sample gas generated from silage to be measured;
a second gas flow path for supplying a purge gas that does not contain a gas component to be measured; and
a third gas flow path for supplying a reference gas having a predetermined component composition, wherein
in the surface stress sensor, a response characteristic to at least one of organic acids belonging to C2 and C3 and a response characteristic to at least one of organic acids belonging to C4 are different, wherein the C2 and C3 refer to organic acids having 2 or 3 carbon atoms, respectively, and the C4 refers to organic acids having 4 or more carbon atoms, and
the sample gas supplied from the first gas flow path, the purge gas supplied from the second gas flow path, and the reference gas supplied from the third gas flow path are switched in a predetermined order and supplied to the at least one surface stress sensor to generate signals from the at least one surface stress sensor, thereby performing the evaluation method for silage fermentation quality according to claim 14.

17. The evaluation device for silage fermentation quality according to claim 16, further comprising
an additional gas sensor and an additional gas flow path for supplying the sample gas to the additional gas sensor,
wherein the evaluation of silage fermentation quality is performed based on the signals from the at least one surface stress sensor and the signals from the additional gas sensor.

18. The evaluation method for silage fermentation quality according to claim 1, wherein the gas generated from the silage is supplied to an additional gas sensor, and the evaluation of silage fermentation quality is performed based on the signals from the surface stress sensor and signals from the additional gas sensor.

19. An evaluation device for silage fermentation quality comprising:
   at least one surface stress sensor;
   a first gas flow path for supplying a sample gas generated from silage to be measured; and
   a second gas flow path for supplying a purge gas that does not contain a gas component to be measured, wherein
   in the surface stress sensor, a response characteristic to at least one of organic acids belonging to C2 and C3 and a response characteristic to at least one of organic acids belonging to C4 are different, wherein the C2 and C3 refer to organic acids having 2 or 3 carbon atoms, respectively, and the C4 refers to organic acids having 4 or more carbon atoms, and
   the sample gas supplied from the first gas flow path and the purge gas supplied from the second gas flow path are alternately switched and supplied to the at least one surface stress sensor to generate signals from the at least one surface stress sensor, thereby performing the evaluation method for silage fermentation quality according to claim 1.

20. The evaluation device for silage fermentation quality according to claim 19, further comprising
   an additional gas sensor and an additional gas flow path for supplying the sample gas to the additional gas sensor,
   wherein the evaluation of silage fermentation quality is performed based on the signals from the at least one surface stress sensor and signals from the additional gas sensor.

* * * * *